United States Patent
Huet et al.

(10) Patent No.: US 10,848,619 B2
(45) Date of Patent: Nov. 24, 2020

(54) COMMUNICATIONS NETWORK SECURITY FOR HANDLING PROXY VOICE CALLS

(71) Applicant: AT&T Intellectual Property I, L.P., Atlanta, GA (US)

(72) Inventors: Miranda Huet, Austin, TX (US); James Pratt, Round Rock, TX (US); Eric Zavesky, Austin, TX (US); Gregory Edwards, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/295,537

(22) Filed: Mar. 7, 2019

(65) Prior Publication Data

US 2020/0288014 A1 Sep. 10, 2020

(51) Int. Cl.
| | |
|---|---|
| *H04M 3/493* | (2006.01) |
| *H04M 3/51* | (2006.01) |
| *G10L 15/08* | (2006.01) |
| *G10L 13/00* | (2006.01) |

(52) U.S. Cl.
CPC .......... *H04M 3/4931* (2013.01); *G10L 13/00* (2013.01); *G10L 15/08* (2013.01); *H04M 3/5166* (2013.01); *G10L 2015/088* (2013.01)

(58) Field of Classification Search
CPC combination set(s) only.
See application file for complete search history.

(56) References Cited

U.S. PATENT DOCUMENTS

| | | |
|---|---|---|
| 6,175,562 B1 | 1/2001 | Cave |
| 6,349,222 B1 | 2/2002 | Hafiz |
| 7,263,178 B1 | 8/2007 | Brothers et al. |
| 7,295,664 B1 | 11/2007 | Hajji et al. |

(Continued)

FOREIGN PATENT DOCUMENTS

| | | |
|---|---|---|
| CN | 103929523 | 7/2014 |
| CN | 106101366 | 11/2016 |

OTHER PUBLICATIONS

Diao et al., "Your Voice Assistant is Mine: How to Abuse Speakers to Steal Information and Control Your Phone," Proceedings of the 4th ACM Workshop on Security and Privacy in Smartphones and Mobile Devices, Nov. 7, 2014, ACM 2014.

(Continued)

*Primary Examiner* — Akelaw Teshale
(74) *Attorney, Agent, or Firm* — Hartman & Citrin LLC

(57) ABSTRACT

Concepts and technologies are disclosed herein for communications network security for handling proxy voice calls that employ a voicebot. According to one aspect disclosed herein, a call handling system can intercept, from a communications network, a call request that is directed to a called target device. The call handling system can determine that the call request was generated by a voicebot on behalf of a user equipment. The call handling system can suspend the call request from being routed to the called target device. The call handling system can generate a voicebot confirmation request that identifies the voicebot and the user equipment. The call handling system can provide the voicebot confirmation request to the called target. The call request can be suspended while the voicebot confirmation request is provided to the called target device.

20 Claims, 8 Drawing Sheets

(56) References Cited

U.S. PATENT DOCUMENTS

| | | | |
|---|---|---|---|
| 8,085,915 | B2 | 12/2011 | Reumann et al. |
| 8,121,653 | B2 | 2/2012 | Marti et al. |
| 8,433,041 | B2 | 4/2013 | Clark et al. |
| 8,583,094 | B2 | 11/2013 | Wang |
| 9,020,117 | B2 | 4/2015 | Caceres et al. |
| 9,277,049 | B1* | 3/2016 | Danis ............... H04M 3/54 |
| 9,560,198 | B2 | 1/2017 | Farrand et al. |
| 9,641,954 | B1 | 5/2017 | Typrin et al. |
| 9,762,731 | B1 | 9/2017 | Cohen |
| 1,001,400 | A1 | 7/2018 | Smith et al. |
| 1,007,992 | A1 | 9/2018 | Kashimba et al. |
| 1,010,286 | A1 | 10/2018 | Baracaldo Angel et al. |
| 1,013,439 | A1 | 11/2018 | Typrin |
| 10,523,814 | B1* | 12/2019 | Moore ............... H04M 3/436 |
| 2003/0105827 | A1* | 6/2003 | Tan ............... H04L 67/306 709/206 |
| 2011/0294478 | A1 | 12/2011 | Trivi et al. |
| 2014/0185786 | A1* | 7/2014 | Korn ............... H04M 3/4936 379/210.02 |
| 2015/0195403 | A1 | 7/2015 | Goulet et al. |
| 2017/0358296 | A1* | 12/2017 | Segalis ............... G10L 15/222 |
| 2018/0013881 | A1 | 1/2018 | Cooper |
| 2018/0063326 | A1 | 3/2018 | Tichauer et al. |
| 2018/0220000 | A1 | 8/2018 | Segalis et al. |
| 2018/0249005 | A1* | 8/2018 | Dowlatkhah ............ H04W 4/16 |
| 2019/0020759 | A1* | 1/2019 | Kuang ............... G06N 20/00 |
| 2019/0174000 | A1* | 6/2019 | Bharrat ............ H04M 3/42059 |

OTHER PUBLICATIONS

Ravi et al., "Personal assistance accessible via a telephone call," Technical Disclosure Commons, Aug. 17, 2017.

Leviathan et al., "Google Duplex: An AI System for Accomplishing Real-World Tasks Over the Phone," Google AI Blog, May 8, 2018, ai.googleblog.com.

Iribarren, Maddie, "Neural Text-To-Speech Development Allows Alexa to Sound More Realistic," Voicebot.ai, Nov. 29, 2018, <https://voicebot.ai/2018/11/29/neural-text-to-speech-development-allows-alexa-to-sound-more-realistic/>.

Lorenzo-Trueba et al., "Robust Universal Neural Vocoding," arXiv.org, 1811.06292v1, Nov. 15, 2018, <https://arxiv.org/pdf/1811.06292.pdf>.

Latorre et al., "Effect of Data Reduction on Sequence-To-Sequence Neural TTS," arXiv.org, 1811.06315v2, Nov. 23, 2018, <https://arxiv.org/pdf/1811.06315.pdf>.

Lee et al., "Voice Imitating Text-to-Speech Neural Networks," arXiv.org, 1806.00927v1, Jun. 4, 2018, <https://arxiv.org/pdf/1806.00927.pdf>.

Jin et al, "FFTNet: a Real-Time Speaker-Dependent Neural Vocoder," $43^{rd}$ IEEE ICASSP, Princeton University, Adobe Research, Apr. 2018, <https://gfx.cs.princeton.edu/pubs/Jin_2018_FAR/fftnet-jin2018.pdf>.

* cited by examiner

COMMUNICATIONS NETWORK SECURITY FOR HANDLING PROXY VOICE CALLS

BACKGROUND

As communication devices become more prevalent, many users may almost always be considered available and/or capable of engaging in various audio and/or visual communications, irrespective of whether the user is available. This may lead to users of communication devices receiving many calls per day at times when, although convenient for the caller, may not be convenient for the user that is the intended recipient of the calls. Increasingly, a growing number of calls originate from a calling party with the intent to obfuscate or mislead (e.g., from spammers and/or nefarious commercial entities), and thus it may never be convenient for the called party to accept those calls. Repeated calls of this nature can lead a called party to only answer calls when the called party believes they know and/or are familiar with the identity of the calling party. Yet in certain situations where the called party maintains one or more communication devices to receive calls from various calling parties, such as in a business environment, the called party may not desire to simply ignore calls from unknown or unfamiliar callers because such callers could be placing legitimate, innocuous calls. Moreover, some nefarious calling parties may attempt to use a communications network to attack or otherwise harm a called target device and/or network associated with the called party.

SUMMARY

Concepts and technologies disclosed herein are directed to communications network security for handling proxy voice calls that employ a voicebot. According to one aspect of the concepts and technologies disclosed herein, a method is disclosed. The method can include intercepting, by a call handling system from a communications network, a call request that is directed to a called target device. The method can further include determining, by the call handling system, that the call request was generated by a voicebot on behalf of a user equipment. The method can further include suspending, by the call handling system, the call request from being routed to the called target device. The method can further include generating, by the call handling system, a voicebot confirmation request that identifies the voicebot and the user equipment. The method can include providing, by the call handling system, the voicebot confirmation request to the called target device, where the call request can be suspended while the voicebot confirmation request is provided to the called target device. The call request can request establishment of a proxy voice call between the voicebot and the called target device. In various embodiments, the proxy voice call does not connect the user equipment to the called target device. In various embodiments, the user equipment authorized establishment of the proxy voice call but did not generate the call request for the called target device.

In some embodiments, the method can include validating, by the call handling system, whether the voicebot is permitted to contact and engage in a proxy voice call with the called target device. In some embodiments, validating whether the voicebot is permitted to contact and engage in the proxy voice call with the called target device can be based at least on a community bot registry. In some embodiments, the method can further include releasing, by the call handling system, the call request to establish the proxy voice call between the voicebot and the called target device. In some embodiments, releasing the call request can be based on the answering voicebot of the called target device. In some embodiments, the method can include determining, by the call handling system, that the called target device invokes an answering voicebot to engage in the proxy voice call.

In some embodiments, the method can include determining that the call was generated by the voicebot based on determining that a neural vocoder is invoked by the voicebot such that the proxy voice call would be connected between the voicebot and the called target device without also connecting the user equipment to the called target device. In some embodiments, the voicebot can be configured to engage in the proxy voice call with the called target device using a neural vocoder and without reliance on the user equipment executing a vocoder to provide speech encoding during the proxy voice call. In some embodiments, the method can include determining that the called target device is associated with one or more of an interactive voice response system or a voicemail service. In some embodiments, the method can include generating and providing a voicebot interaction record to the called target device, where the voicebot interaction record can indicate and include historical call detail records pertaining to the voicebot that is requesting establishment of the proxy voice call. In some embodiments, the neural vocoder is configured such that, when a proxy voice call is occurring, a called party associated with the called target device, the called target device, and/or the answering voicebot cannot detect that the proxy voice call is connected to the voicebot instead of the user equipment. In some embodiments, the method can include receiving, by the call handling system, a voicebot confirmation response from the called target device, where the voicebot confirmation response indicates whether the voicebot is permitted to contact and engage in the proxy voice call with the called target device. In some embodiments, the method can include updating, by the call handling system, the isolated registry and/or the community bot registry based on the voicebot confirmation response.

According to another aspect of the concepts and technologies disclosed herein, a system is disclosed. The system can include a processor and a memory. The memory can store computer-executable instructions that, when executed by the processor, cause the processor to perform operations. The operations can include intercepting, from a communications network, a call request that is directed to a called target device. The operations can include determining that the call request was generated by a voicebot on behalf of a user equipment. The operations can include suspending the call request from being routed to the called target device. The operations can include generating a voicebot confirmation request that identifies the voicebot and the user equipment. The operations can include providing the voicebot confirmation request to the called target, where the call request is suspended while the voicebot confirmation request is provided to the called target device. In various embodiments, the call request can request establishment of a proxy voice call between the voicebot and the called target device. In various embodiments, the proxy voice call does not connect the user equipment to the called target device. In various embodiments, the user equipment authorized establishment of the proxy voice call but did not generate the call request for the called target device.

In some embodiments, the operations can include validating whether the voicebot is permitted to contact and engage in a proxy voice call with the called target device.

The operations can include releasing the call request to establish the proxy voice call between the voicebot and the called target device. In some embodiments, validating whether the voicebot is permitted to contact and engage in the proxy voice call with the called target device can be based on a community bot registry. In some embodiments, the operations can include determining, by the call handling system, that the called target device invokes an answering voicebot to engage in the proxy voice call. In some embodiments, releasing the call request can be based on the answering voicebot of the called target device.

According to yet another aspect, a computer storage medium is disclosed. The computer storage medium can have computer-executable instructions stored thereon. The computer-executable instructions can be associated with a private call blocking service of a communications network. When the computer-executable instructions are executed by a processor, the processor can perform operations. In some embodiments, the processor can be included in a computer system. The operations can include intercepting, from a communications network, a call request that is directed to a called target device. The operations can include determining that the call request was generated by a voicebot on behalf of a user equipment. The operations can include suspending the call request from being routed to the called target device. The operations can include generating a voicebot confirmation request that identifies the voicebot and the user equipment. The operations can include providing the voicebot confirmation request to the called target, where the call request is suspended while the voicebot confirmation request is provided to the called target device. In various embodiments, the call request can request establishment of a proxy voice call between the voicebot and the called target device. In various embodiments, the proxy voice call does not connect the user equipment to the called target device. In various embodiments, the user equipment authorized establishment of the proxy voice call but did not generate the call request for the called target device.

In some embodiments, the operations can include validating whether the voicebot is permitted to contact and engage in a proxy voice call with the called target device. The operations can include releasing the call request to establish the proxy voice call between the voicebot and the called target device. In some embodiments, validating whether the voicebot is permitted to contact and engage in the proxy voice call with the called target device can be based on a community bot registry. In some embodiments, the operations can include determining, by the call handling system, that the called target device invokes an answering voicebot to engage in the proxy voice call. In some embodiments, releasing the call request can be based on the answering voicebot of the called target device.

It should be appreciated that the above-described subject matter may be implemented as a computer-controlled apparatus, a computer process, a computing system, or as an article of manufacture, such as a computer storage medium. Other systems, methods, and/or articles of manufacture according to embodiments described herein will be or become apparent to one with skill in the technology upon a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
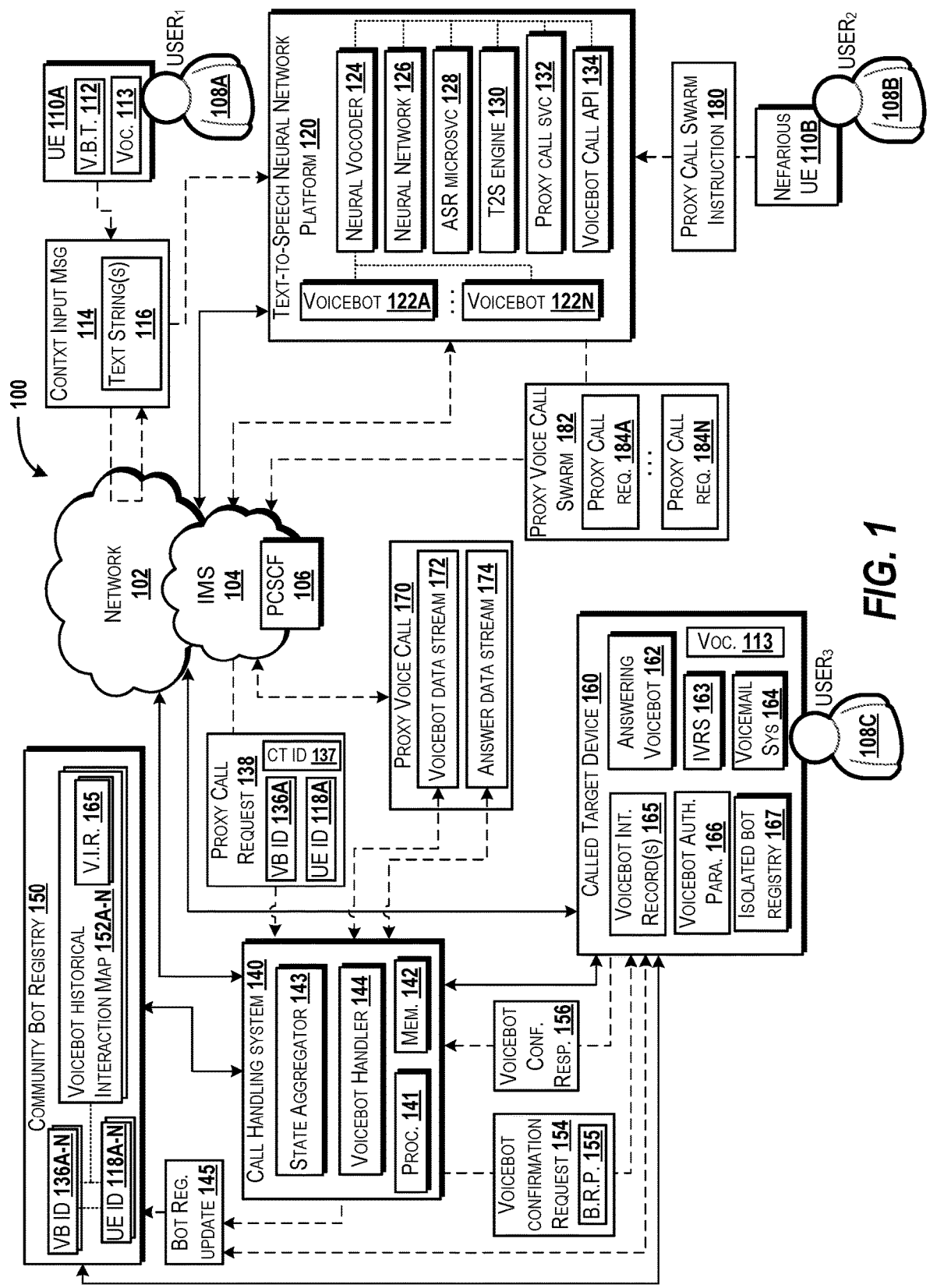
FIG. 1 is a block diagram illustrating an operating environment in which embodiments of the concepts and technologies disclosed herein can be implemented.

The following detailed description is directed to communications network security for handling proxy voice calls that employ one or more voicebot. A "voicebot" refers to an instance of an autonomous artificial intelligence communication service that engages in voice calls from a text-to-speech neural network platform. A voicebot does not refer to simply a "robocaller" which repetitiously executes a pre-recorded audio file to every called party and/or called target device, irrespective of who the called party is, what the called party says, or what is executing on the called target device. In contrast, a voicebot can autonomously place and engage in voice calls on behalf of a user based on contextual input from a user equipment associated with the user. Specifically, a voicebot uses one or more instances of initial input of text strings to obtain contact information and generate a request for a proxy voice call to an intended target, such as a called target device. As such, a user (who otherwise would have had to make a call themselves) can authorize the voicebot to generate and fully engage—from start to finish—in a proxy voice call with a called party without the user ever participating in the proxy voice call (i.e., without the user needing to provide audio input during the proxy voice call). The voicebot can use a neural vocoder to engage in an ad-hoc, natural language conversation with the called party. The voicebot can engage in the conversation flow autonomously based on the contextual input initially provided by the user, and further based on subsequent audio input (captured in an answer data stream of the proxy voice call) that is from the called party device and sent to the voicebot during the proxy voice call. The voicebot can incorporate speech latency (e.g., latency to match the called party pattern of speech) and speech disfluencies (e.g., verbal queues such as "uh,""mhmm,""hmm," etc.) within a voice call so as to mimic actual human conversation, which may cause a called party to be unable to detect that the proxy voice call involves the voicebot instead of the user.

Because voicebots can adopt various dialects and mimic different versions of a human's voice, there is a risk that nefarious individuals will implement instances of voicebots in a malicious manner. Additionally, multiple instances of the same voicebot may be supported via a voicebot service that is hosted from the same network source (e.g., a text-to-speech neural network platform), thereby enabling multiple users to use the voicebot service concurrently. As such, nefarious users may attempt to use an instance of a voicebot for malicious uses, such as configuring the voicebot to attack one or more called target devices by emulating a distributed denial-of-service attack that floods the targeted systems with concurrent proxy call requests to engage in proxy voice calls. Other malicious scenarios to compromise a communications network and/or called target device are conceivable, such as but not limited to, causing a voicebot to invoke an ad-hoc script based on a shared contextual input such that various instances of voicebots call and schedule fake appointments with the called target device, thereby stuffing a scheduling queue and preventing other bona fide users from engaging in services associated with the called target device. Because the called party would not be able to distinguish the voicebot from a real human being, the called party and called target device would be unaware that an attack on their system has occurred. Moreover, users associated with critical societal infrastructure (e.g., personnel from such as hospitals, fire departments, police, bomb squads, etc.) may receive, from one or more voicebots, proxy voice calls that falsely request assistance in order to flood the called target devices and/or draw out associated personnel so that bona fide emergencies are unable to be addressed (e.g., real people being prevented from calling 911, requesting help from fire department, unable to schedule doctor appointments, etc.)

As such, embodiments of the present disclosure provide a call handling system that provides a network platform by which communications networks and called target devices can be protected from nefarious voicebots and/or prevent unwanted calls from voicebots. Aspects of the present disclosure provide a state aggregator and a community bot registry that is network based. The state aggregator of the call handling system can communicate a community bot registry that is network-based and communicate with an isolated bot registry that is provided by a called target device. In some embodiments, proxy call requests sent by voicebots can be inspected and undergo validation tests based on information from the community bot registry. The call handling system can also inform an answering bot on the called target device of the incoming proxy call request, thereby causing the answering voicebot to perform validation tests using the isolated bot registry accessible to the called target device. In various embodiments, the call handling system and/or the answering bot on the called target device can perform baseline validation tests that encompass the types and number of transactions that a voicebot historically engaged in, along with performance of natural language understanding analysis while a proxy voice call is in progress, such as detection of repeated phrases, repeated timing between phrases from the voicebot, format analysis of parametric speech synthesis, and/or noiseless reconstruction analysis. It should be understood that the examples provided are for illustration purposes only, and therefore should not be construed as limiting in any way.

The call handling system and/or the answering bot on the called target device can identify common vectors for multiple call proxy requests, such as frequency of calls, time of day, repeated requests, shared cadence and tone, shared types of word usage and vocabulary level, same sound frequency range (e.g., measured in hertz) for audio output provided by voicebot, or the like. The call handling system can track and generate instances of voicebot interaction records that can be included in a bot registry update so as to keep a historical record of interactions for a particular voicebot authorized by a corresponding user. When voicebots pass inspection, the call handling system can update the community bot registry and/or the isolated bot registry of the called target device.

The community bot registry and/or the isolated bot registry can include transaction/interaction records of various voicebots according to the corresponding user equipment that authorized the use of the voicebot. The community bot registry and/or the isolated bot registry can indicate when a "false positive" has occurred (i.e., when the call handling system validates the voicebot as being permitted to contact the called target device, but the called target device determines that the voicebot should not have been permitted to contact and/or engage in a proxy voice call). These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for various embodiments of the concepts and technologies disclosed herein for providing communications network security for handling proxy voice calls with voicebots will be described, according to an illustrative embodiment. The operating environment 100 shown in FIG. 1 includes a communications network ("network") 102, an Internet Protocol multimedia subsystem ("IMS") 104, a proxy call session control function ("PCSCF") 106, a user 108A associated with a user equipment ("UE") 110A, a second user 108B associated with a nefarious UE 110B, a called party 108C associated with a called target device 160, a text-to-speech neural network ("T2SNN") platform 120, a call handling system 140, and a community bot registry 150.

In various embodiments, the network 102 can include one or more of instances of a radio access network, an evolved packet core network, a core network, an IP-based network, a transport network, an optical transport network, a circuit switched network, such as publicly switched telephone network ("PSTN"), a cellular network, a mobile Wide Area Network, a combination thereof, or the like. In some embodiments, the network 102 can include one or more network edge devices that provide communicative coupling, such as an access point that can provide communicative coupling between one or more devices of the operating environment 100. An access point of the network can provide wired and/or wireless communicative coupling and can include, but should not be limited to, one or more of a base transceiver station, a wireless router, a femtocell, an eNode B, a NodeB, a gNodeB (i.e., an access point that incorporates New Radio access technology, such as LTE Advanced and other 5G technology), a multi-standard metro cell node, a customer premise edge node (e.g., an optical network terminal), and/or other network nodes or combinations thereof that are capable of providing communication to and/or from the network 102. It should be understood that the examples provided are for illustration purposes only, and therefore should not be construed as limiting in any way.

In the embodiment illustrated in FIG. 1, the operating environment 100 can include an instance of the IMS 104 that can be included in, and/or communicatively coupled to, the network 102. The IMS 104 can provide and facilitate a network architecture that supports internet protocol-based packet-switched networking, which in turn can support voice calls via data packets. The IMS 104 may interact with one or more circuit-switched network systems of the network 102 such that communications may be accessed via a variety of routes. In some embodiments, the IMS 104 can include the PCSCF 106. According to various embodiments of the concepts and technologies described herein, the PCSCF 106 can route various communications (e.g., proxy call requests, data streams associated with a proxy voice call, voicebot interaction records, and any other data communication discussed herein) to, from, through, and/or between one or more systems, platforms, and/or devices of the operating environment 100. In some embodiments, the PCSCF 106 can be supported and/or facilitated in a virtual and/or non-virtual computing system. In some embodiments, the call handling system 140 (discussed in further detail below) may operate as part of the IMS 104 and may host the execution and/or function of at least part of the PCSCF 106. In some embodiments, the PCSCF 106 may be configured by the call handling system 140 to intercept and re-route instances of a proxy call request, such as a proxy call request 138, and/or a proxy voice call, such as a proxy voice call 170, to the call handling system 140 so as to facilitate performance of one or more operations discussed herein. Because the IMS 104 and PCSCF 106 are generally understood, the IMS 104 and the PCSCF 106 will not be further described herein.

According to various embodiments, the functionality of a UE, such as any of the UE 110A and/or the nefarious UE 110B, may be provided by one or more server computers, desktop computers, mobile telephones, smartphones, tablet computers, wearable smart devices, laptop computers, smart appliances, web browsers (e.g., browser-based implementations of communication devices), set-top boxes, personal home assistant devices, vehicle computing systems, other computing systems, and the like. It should be understood that the functionality of a UE discussed herein, such as the UE 110A and the nefarious UE 110B, can be provided by a single device, by two or more similar devices, and/or by two or more dissimilar devices. For purposes of describing the concepts and technologies disclosed herein, the UE 110A and the nefarious UE 110B are described herein as a communication device that can engage in wired and/or wireless communicative coupling, such as a smartphone. In some embodiments, the UE 110A and/or the nefarious UE 110B can be embodied by an instance of a computing system or a communication device, which are discussed below with respect to FIG. 6 and FIG. 7, respectively. It is understood that the phrase "nefarious" (e.g., the nefarious UE 110B) is provided for illustration purposes only, such as to convey potential embodiments where a particular user (e.g., the second user 108B) seeks to employ aspects of voicebots for nefarious purposes. As such, any of the UEs discussed herein may be referred to using labels of demarcation for illustration purposes only, such as first UE, second UE, another UE, or any other phrase by which to distinguish multiple instances of UEs within the operating environment 100. As used herein, reference to the terms "first," "second," "third," or the like are for labeling purposes only, and therefore should not be construed as implying an order, hierarchy, preference, worth, or the like. It should be understood that the embodiments discussed herein are illustrative and should not be construed as being limiting in any way.

Figure 6:
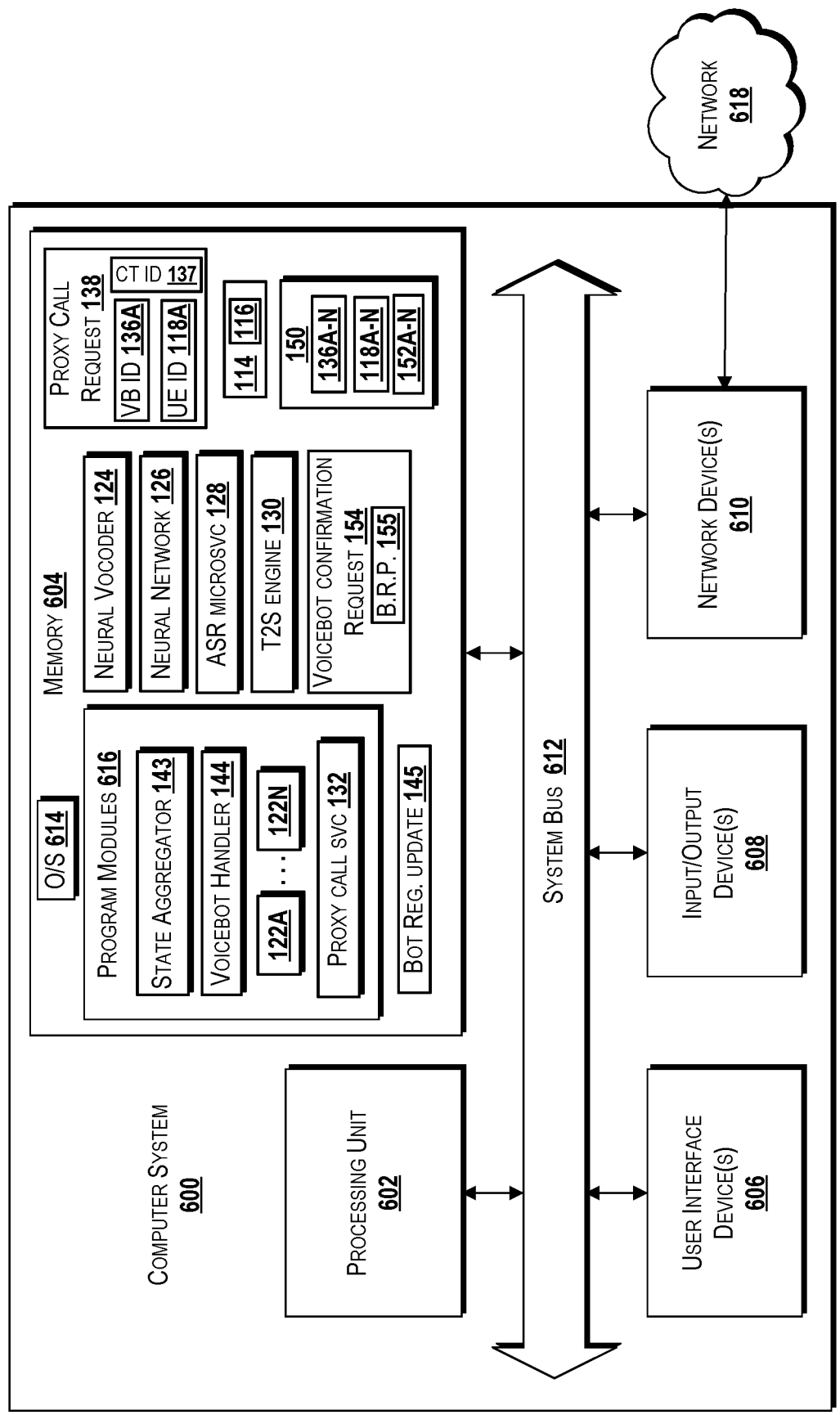
FIG. 6 is a block diagram illustrating an example computer system configured to provide, implement, facilitate, and/or otherwise support aspects of embodiments of the concepts and technologies described herein.
Figure 7:
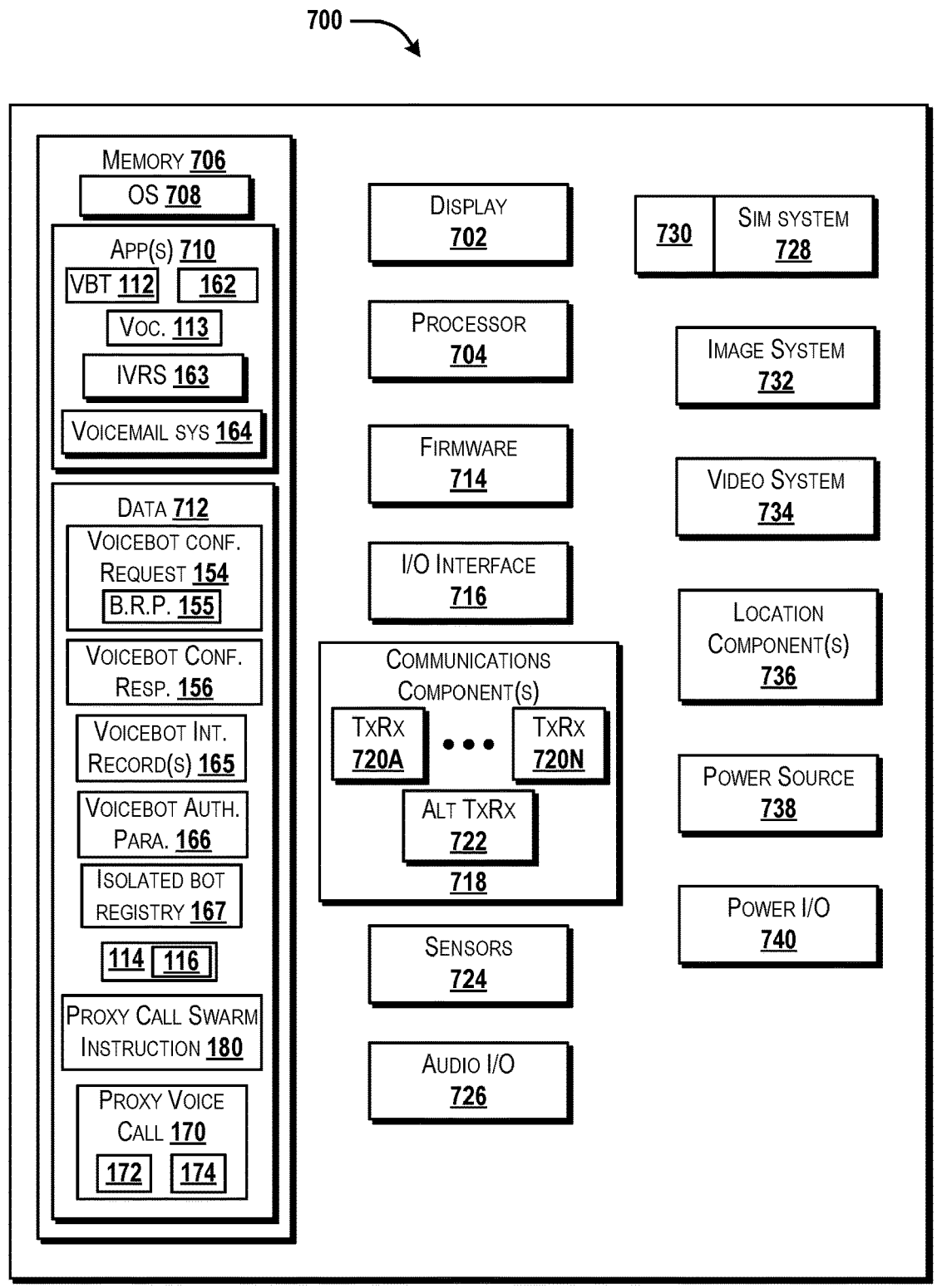
FIG. 7 is a block diagram illustrating an example communication device capable of implementing aspects of the embodiments of the concepts and technologies described herein.

In various embodiments, an instance of a UE (e.g., the UEs 110A, 110B) can include a processor, a memory, and communication components, which are discussed in further detail with respect to FIG. 6 and FIG. 7. A UE can execute an operating system and one or more instances of instructions that may, for example, be formatted as software, firmware, or other combinations thereof. A UE (e.g., the UEs 110A, 110B) can store and execute an instance of a voicebot tool, such as a voicebot tool 112. The voicebot tool 112 may execute in the background of the user's device (e.g., UE 110A), and can have, or otherwise be granted, access privileges to operations, inputs, and outputs of the UE. For example, an instance of the voicebot tool 112 may be granted root access (or another level of access) so as to monitor and analyze user input (e.g., audio input, user interface input via a display device, image capture, or the like) while other applications are operating and executing on the UE. It is understood that the voicebot tool 112 does not participate in a proxy voice call (e.g., proxy voice call 170), but rather, may analyze one or more text strings 116 (also referred to herein as text strings 116A and 116B with reference to FIGS. 2A and 2B) from the user's device, irrespective of whether the text strings 116 were provided by a user via touch input, vocal input, another application on the UE, or the like. For example, the text strings 116 may be instances of information pulled from one or more applications executing on the user's device (e.g., the UE 110A) and/or from memory of the user's device, such as from calendar application, message application, social media application, or the like. As further discussed in an illustrative example shown in FIGS. 2A and 2B, a messaging application may be executing on the device that enables users to communicate with each other via audio/visual communications (e.g., short message service text packages, IP-based messages, etc.). While the voicebot tool 112 is concurrently executing with the messaging application on the UE 110A, the voicebot tool 112 can (a) periodically and/or continually scrape and analyze user input, such as text strings 116. It is understood that when the user 108A desires to place a voice call themselves, the user 108A would provide input to the UE 110A that launches and invokes a vocoder 113 so as to cause the UE 110A to capture audio input from the user 108A (e.g., via a microphone), synthesize the audio input for audio data compression, and also facilitate voice encryption and transformation so as to enable the UE 110A to participate and engage in a voice call with another device. If the UE 110A were to engage in a voice call with another device, then the vocoder 113 would be invoked and executed on the UE 110A so that the voice of the user 108A could be heard by the called party. Thus, the vocoder 113 would be invoked and used on the UE 110A when the UE 110A generates a call request itself and/or is connected, participating, or otherwise engaged in a voice call with another device. Thus, in situations where the UE 110A places and engages in a voice call, an identifier of the vocoder 113 may be included in a call request so that the network 102 can provide proper data transformation and compression to connect with the device of the called party.

However, in various embodiments, the user 108A and the UE 110A are not generating a call request (or a proxy call request 138) from the UE 110A, and thus the UE 110A is not (and will not be) communicatively coupled to, connected to, engaged in, or otherwise participating in a voice call or in the proxy voice call 170 with the called target device 160. The UE 110A can authorize or approve of the T2SNN platform 120 generating a proxy call request 138 on behalf of the UE 110A (and also engaging in the proxy voice call 170 with the called target device 160 on behalf of the UE 110A), but the UE 110A does not generate a call request, much less the proxy call request 138, because the UE 110A does not participate in the proxy voice call 170. Moreover, in some embodiments, the UE 110A does not request, command, or otherwise instruct the T2SNN platform 120 to generate the proxy call request 138 or engage in the proxy voice call 170 on behalf of the UE 110A because the voicebot tool 112 determines when a proxy voice call could be made on behalf of the user 108A and UE 110A, and once approval is granted by the UE 110A, the voicebot tool 112 provides a contextual input message 114 to the T2SNN platform 120, but the contextual input message 114 may not (in and of itself) provide enough of the requisite network information (e.g., a telephone number, email address, or other contact information) that would otherwise be required to enable the IMS 104 and/or the PCSCF 106 to establish the proxy voice call 170. As discussed further below, the T2SNN platform 120 can use the contextual input message 114 to independently obtain sufficient information to generate the proxy call request 138 on behalf of the UE 110A. This means that despite the UE 110A authorizing the proxy call request 138 to be generated by the T2SNN platform 120 on behalf of the UE 110A (so that the proxy voice call 170 can occur without the UE 110A, but instead between the T2SNN platform 120 and the called target device 160), the vocoder 113 on the UE 110A is not used or invoked during the proxy voice call 170 because the UE 110A that authorized placement of the proxy voice call 170 does not connect, engage, or participate in the proxy voice call 170. Stated differently, the proxy voice call 170 occurs between the T2SNN platform 120 and the called target device 160 based on contextual input message 114 initially provided from the UE 110A, but without the UE 110A ever being connected to the called target device 160 during the proxy voice call 170 and without the UE 110A generating or placing a call request, such as the proxy call request 138. Therefore, an identifier associated with the vocoder 113 of the UE 110A that otherwise would have been provided to establish a voice call from the UE 110A, is not provided in the proxy call request 138 because the UE 110A is not communicatively coupled to the called target device 160 for the proxy voice call 170.

The voicebot tool 112 can capture and analyze user input that is provided via audio (e.g., a microphone, execution of an audio file, etc.) and/or a user interface (e.g., input of text strings to the messaging application). The voicebot tool 112 can be triggered by certain user input (e.g., text phrases, keywords, or other strings from an application on the UE 110A) to prompt a user (e.g., the user 108A) to suggest and/or authorize use of a proxy call service, such as a proxy call service 132 hosted by the T2SNN platform 120, which operates to generate and engage in proxy voice calls on behalf of the user (e.g., the user 108A). For example, the voicebot tool 112 can scrape one or more instances of the text string 116 from the UE 110A, where the text string 116 is input by the user 108A during execution of a mobile application (e.g., a messaging application on the UE 110A) that does not provide or otherwise support voice calls to another device (e.g., the called target device 160). As such, the text string 116 does not include a phone number, an email address, a caller ID handle, a contact address, or any other network address that would otherwise be used by the UE 110A to generate and place a voice call from the UE 110A. Because the proxy voice call 170 does not connect or otherwise include the UE 110A and/or the user 108A, a vocoder 113 on the UE 110A is not invoked, executed, or otherwise used to generate a proxy call request 138 and/or during the proxy voice call 170.

The voicebot tool 112 on the UE 110A can generate a contextual input message, such as the contextual input message 114, that includes one or more instances of the text string 116 that is pulled from the UE 110A. The contextual input message 114 can include information associated with the called party 108C and/or information pertaining to why the proxy voice call 170 should occur. For example, the contextual input message 114 can include a name associated with the called party 108C, a summary of what is to be accomplished during the proxy voice call 170, and/or time and date information that should be conveyed to the called party 108C. In some embodiments, the contextual input message 114 does not provide a phone number, an email address, or any other usable network address that would enable the UE 110A to engage in a voice call with the called target device 160. Instead, the contextual input message 114 can be provided to the T2SNN platform 120, which in turn can use the text strings 116 to obtain the necessary contact information to generate the proxy call request 138 and contact the called target device 160. In an embodiment, the contextual input message 114 may include a phone number or contact information of the called target device 160 so that the T2SNN platform 120 does not have to independently obtain the information. The voicebot tool 112 can configure the contextual input message 114 to be directed to the proxy call service 132 of the T2SNN platform 120. The contextual input message 114 can be provided to the network 102, which in turn routes the contextual input message 114 to the T2SNN platform 120. The information included in the contextual input message 114 pertains to data for an application layer/level of a device, and therefore does not operate at a transport layer, a network layer, and/or a data link layer associated with the network 102 (e.g., from an open systems interconnection model) with information sufficient to be routed to the called target device 160. As such, the contextual input message 114 and any information included therein (e.g., the text strings 116) cannot serve as information that directly provides routing, contact, or address information at a transport layer and/or network layer for establishment of the proxy voice call 170. Rather, the contextual input message 114 can include information at a session layer, presentation layer, and/or application layer that is routed or otherwise directed to the T2SNN platform 120. Put simply, the contextual input message 114 may not include a phone number associated with the called target device 160. Further discussion of an illustrative embodiment of the contextual input message 114 and implementation of the voicebot tool 112 is provided below in further detail with respect to FIGS. 2A and 2B. It should be understood that the examples discussed herein are illustrative and should not be construed as being limiting in any way.

According to various embodiments, the T2SNN platform 120 can be associated with a third-party cloud-service provider. As such, in various embodiments, a communications service provider associated with at least a portion of the network 102 may provide access and route communications to the T2SNN platform 120. The T2SNN platform 120 can be supported by one or more instances of processor resources and memory resources in a network environment, such as one or more platform servers, network nodes, computing systems, or the like. The T2SNN platform 120 can host the proxy call service 132, which can provide various user equipment (e.g., the UEs 110A, 110B) with access to functions and features provided by a voicebot, such as one or more instances of the voicebot 112A-N. It is understood that use of the term "service" herein (including in the claims) refers to a network-based application that facilitates transformation of information and enables operations by one or more processor resources and memory resources, and therefore any use of the term "service" (and variations thereof) in the claims should not be construed or interpreted as being directed to, including, or otherwise pertaining to an abstract idea, a judicial exception, or any other non-patent eligible subject matter.

The T2SNN platform 120 can receive one or more instances of the contextual input message 114 via a voicebot call application programming interface ("voicebot call API") 134. The proxy call service 132 can instantiate an instance of a voicebot to handle the contextual input message 114, such as one of the voicebots 122A-N. A voicebot, such as any of the voicebots 122A-N, facilitates text-to-speech synthesis and manages the generation of proxy call requests (e.g., the proxy call request 138) and participation in instances of the proxy voice call 170 without including or connecting the UE 110A to the called target device 160. In various embodiments, a voicebot (e.g., any of voicebots 122A-N) can include an executable program or other computer-executable instructions for engaging in proxy voice calls that mimic human speech such that the called target device 160 and/or the called party 108C may be unable to distinguish audio output, such as provided in a voicebot data stream 172 of the proxy voice call 170 as discussed below, from human speech (e.g., a human voice associated with the user 108A if the UE 110A were to have engaged in a voice call directly with the called target device 160). The voicebot can invoke and execute one or more of a neural vocoder 124, a neural network 126, an automated speech recognition ("ASR") microservice 128, and a text-to-speech ("T2S") engine 130, each of which can be hosted and/or supported by one or more processing resources and/or memory resources discussed herein, such as a processing unit and memory discussed below with respect to FIG. 6.

In various embodiments, a neural vocoder, such as the neural vocoder 124, can be configured as an executable script that refers to and executes a neural network (e.g., the neural network 126) in order to (re)construct an audible speech output from acoustic feature definitions (e.g., definitions for one or more of voicing decisions, fundamental frequency, mel-generalized cepstral, and/or band aperiodicities), thereby enabling generation of speech output from a voicebot (e.g., any of the voicebots 122A-N) with a natural language speech quality that mimics vocal speech from a human speaker (i.e., with a relative mean score on a Multiple Stimuli with Hidden Reference and Anchor ("MUSHRA") test that is above a naturalness threshold, such as neural vocoders being able to generate speech with a relative mean score above a 70% score threshold yielding good speech quality to mimic human speech, where 100% score corresponds with completely natural human speech and 0% score corresponds with very poor representation of human speech). As such, the neural vocoder 124 is configured to generate audio output that mimics human speech using a variety of "voices" (i.e., synthesized voices of one or more gender) in multiple languages, where the speech output from a voicebot is such that a called party (e.g., the called party 108C) and/or a called device (e.g., the called target device 160) may be unable to detect that the audio output was generated by a voicebot instead of a human (e.g., instead of the user 108A), thereby rendering the called party 108C and/or the called target device 160 unable to distinguish proxy voice calls involving voicebots (e.g., the proxy voice call 170 between the voicebot 122A and the called target device 160) from voice calls involving humans (e.g., a voice call directly between the UE 110A and the called target device 160). It is understood that, unlike neural vocoders (e.g., the neural vocoder 124), conventional text-to-speech vocoders implement waveform generation processes that are not capable of generating speech with acceptable naturalness due to a lack of phase information in short-time Fourier transforms, thereby causing conventional text-to-speech vocoders (i.e., any vocoder that is not a neural vocoder) to produce audio output that has a MUSHRA relative mean score below the naturalness threshold. One of ordinary skill in the technology will recognize that various instances of a neural vocoder may be available from a variety of third-party neural text-to-speech sources, such as but not limited to a neural vocoder from AMAZON DOT COM INC. in Seattle, Wash., "Google Duplex" from ALPHABET INC. in Mountain View, Calif., or other neural vocoder sources. The neural vocoder 124 can generate audible vocal speech data samples that are captured and included in data packets of a voicebot data stream, such as the voicebot data stream 172 of the proxy voice call 170. As such, unlike conventional text-to-speech systems, the T2SNN platform 120 can use an instance of one of the voicebots 122A-N and corresponding elements (e.g., the neural vocoder 124, neural network 126, the ASR microservice 128, the T2S engine 130, and the proxy call service 132) to produce and synthesize audible speech output in an ongoing voicebot data stream 172 directly from a one-time instance of the contextual input message 114 that includes the text strings 116.

In various embodiments the T2SNN platform 120 can include the neural network 126 to support audible vocal speech output from the neural vocoder 124 and/or a voicebot (e.g., any of the voicebots 122A-N). In some embodiments, each instance of one of the voicebots 122A-N may correspond with a different speaker voice, thereby enabling voices in various gender and language combinations. In various embodiments, the neural network 126 can refer to one or more of a linguistics-conditioned convolutional neural network ("CNN"), a recurrent neural network ("RNN"), a deep neural network ("DNN") or a combination thereof. In various embodiments, the neural network 126 may be bidirectional so as to accept the text strings 116 and/or other information (e.g., phoneme data instances) as input and generate or otherwise produce audible vocal speech features that enable one of the voicebots 122A-N to participate in a natural-language conversation with the called party 108C during the proxy voice call 170.

In various embodiments, an instance of the voicebots 122A-N and the neural network 126 may communicate and interface with the ASR microservice 128 and/or the T2S engine 130. In various embodiments, an instance of one of the voicebots 122A-N can analyze the contextual input message 114 (and any text strings 116 included therein) to identify the called party 108C associated with the called target device 160. The instance of the voicebots 122A-N can obtain contact information associated with the called target device 160 (e.g., a phone number) via the proxy call service 132, which has access to profiles (locally or via the network 102) associated with contact information of various called parties. The proxy voice call 170 can be established and initiated based on the proxy call request 138 that is generated by one of the voicebots 122A-N. A further detailed discussion of the proxy call request 138 is provided below. Prior to and/or once the proxy voice call 170 is established, an instance of the voicebots 122A-N can generate a dynamic text script via the T2S engine 130, where the content of the dynamic text script can be dynamically adjusted as the proxy voice call 170 proceeds (without further input from the UE 110A and/or the user 108A). Thus, the content of the dynamic text script is not static or pre-recorded, but rather can be adapted to mimic natural human conversation based on how the conversation with the called target device 160 and the called party 108C proceeds and what information is provided from the called target device 160. The conversation between the called target device 160 and one of the voicebots 122A-N is digitally encapsulated and packetized via portions of the proxy voice call 170.

An instance of the proxy voice call 170 can include a voicebot data stream, such as the voicebot data stream 172, and an answer data stream, such as an answer data stream 174. The voicebot data stream 172 is associated with one of the voicebots 122A-N and the answer data stream 174 is associated with the called target device 160. The voicebot data stream 172 refers to the portion of the proxy voice call 170 that includes data packets generated and sent from one of the voicebots 122A-N of the T2SNN platform 120. The voicebot data stream 172 causes the called target device 160 to present audible vocal output representing natural human speech generated by one of the voicebots 122A-N. Therefore, the voicebot data stream 172 is dynamically created by the T2SNN platform 120 without contact or reliance on the UE 110A, invocation of the vocoder 113 of the UE 110A, and/or the user 108A associated with the UE 110A.

The answer data stream 174 refers to a portion of the proxy voice call 170 which is generated by the called target device 160 in response to the called target device 160 receiving at least a portion of the voicebot data stream 172 during the proxy voice call 170. In some embodiments, the answer data stream 174 may be generated based on an instance of the vocoder 113 being included on the called target device 160, where the called target device 160 may capture audio input from the called party 108C and use an instance of the vocoder 113 on the called target device 160 to create the answer data stream 174 which represents the audible speech portion of the conversation from the called party 108C. The answer data stream 174 is directed to one of the voicebots 122A-N of the T2SNN platform 120 that is engaging with the called target device 160 on behalf of the UE 110A. The voicebot call API 134 can be an API that enables various devices to access the proxy call service 132 and engage in communicative coupling with one of the voicebots 122A-N of the T2SNN platform 120. Therefore, various data (e.g., the proxy call request 138, the proxy voice call 170, etc.) can be sent to/from the T2SNN platform 120. As such, while the proxy voice call 170 is proceeding (ongoing or otherwise being maintained), the ASR microservice 128 can receive the answer data stream 174 and analyze the data packets to perform speech recognition. The ASR microservice 128 can convert or otherwise transform the audible speech from the called target device 160 into text, that in turn can be fed to a corresponding one of the voicebots 122A-N participating in the proxy voice call 170. The corresponding one of the voicebots 122A-N can then prepare a response by generating text strings that would be used as a vocal response by the voicebot during the conversation. The associated one of the voicebots 122A-N can engage the neural network 126 and the neural vocoder 124 to generate data packets that are fed into the voicebot data stream 172 and directed to the called target device 160, thereby enabling the voicebot to continue with the proxy voice call 170 autonomously and without requiring further input from the UE 110A.

To initiate establishment of the proxy voice call 170, one of the voicebots 122A-N (e.g., voicebot 122A) can generate an instance of the proxy call request 138 that is directed to the called target device 160. The proxy call request 138 can be generated on behalf of the UE 110A by one of the voicebots 122A-N, such as the voicebot 122A. The proxy call request 138 can request establishment of a proxy voice call (e.g., the proxy voice call 170) between the voicebot 122A and the called target device 160, without connecting or otherwise including the UE 110A which initially authorized the voicebot 122A to operate and engage in an autonomous conversation on behalf of the UE 110A. The proxy call request 138 refers to a call request that is generated by a voicebot (e.g., one of the voicebots 122A-N) of the T2SNN platform 120, on behalf of the UE 110A, so that a proxy voice call (e.g., the proxy voice call 170) is established with a voicebot (e.g., one of the voicebots 122A-N), thereby preventing the vocoder 113 on the UE 110A from being executed, used, or otherwise invoked.

In some embodiments, the proxy call request 138 may include target contact information corresponding to the called target device 160, such as a contact target identifier ("CT ID") 137. An instance of the CT ID 137 can indicate, represent, and/or include a destination address (e.g., a phone number, IP destination address, etc.) associated with the called target device 160 so that the proxy call request 138 can be directed to the called target device 160 for establishment of the proxy voice call 170 between the called target device 160 and one of the voicebots 122A-N.

In some embodiments, the proxy call request 138 can include a UE identifier ("UE ID"), such as UE identifier 118A of the UE identifiers 118A-N, that is associated with the UE 110A which initially authorized the corresponding voicebot (e.g., the voicebot 122A) to generate the proxy call request 138 on behalf of the UE 110A. For example, the UE ID 118A can correspond to the UE 110A and include one or more of a serial number, a phone number, a caller ID tag, a device moniker (e.g., last name, first name, business name, equipment name, etc.), an international mobile equipment identity, or other identifier that corresponds with the UE 110A that authorized (but did not generate or initiate) the proxy call request 138 and the proxy voice call 170. In some embodiments, the UE ID 118A may further include information associated with the UE 110A and/or the user 108A, such as a caller ID label associated with the UE 110A and/or an identity of the vocoder 113 that is on the UE 110A (but will not be in use by the UE 110A because the UE 110A does not participate the proxy voice call 170).

In some embodiments, the proxy call request 138 can include a voicebot identifier, such as one of voicebot identifiers ("VB ID") 136A-N, corresponding to a voicebot (e.g., one of the voicebots 122A-N) that generated the proxy call request 138 and is requesting the proxy voice call 170 to be established. For example, in an embodiment, the VB ID 136A may correspond with the voicebot 122A. Thus, in an embodiment where the voicebot 122A generated the proxy call request 138, the proxy call request 138 may include the VB ID 136A that corresponds with (or otherwise indicates) the voicebot 122A that can be acting on behalf of the UE 110A. In some embodiments, the VB ID 136A may also (or alternatively) include, indicate, or otherwise represent an identity of the neural vocoder 124 that would be invoked, used, or otherwise executed during the proxy voice call 170 by the T2SNN platform 120. In some embodiments, an instance of the VB ID (e.g., any of the VB IDs 136A-N) may identify the neural vocoder 124 without identifying the specific one of the voicebots 122A-N that was responsible for generating the proxy call request 138. In such embodiments, the call handling system 140 may use the community bot registry 150 (discussed further below) to determine whether or not the proxy call request 138 should be forwarded on to the called target device 160 for establishment of the proxy voice call 170, and once the proxy voice call 170 is established, the voicebot data stream 172 portion of the proxy voice call 170 can be monitored and analyzed to determine which of the voicebots 122A-N is participating in the proxy voice call 170. In various embodiments, the voicebot operating on behalf of the UE 110A, such as the voicebot 122A, can provide the proxy call request 138 from the T2SNN platform 120 via the voicebot call API 134 so as to be routed to the called target device 160 via the network 102, the IMS 104, the PCSCF 106, or a combination thereof. In various embodiments, the proxy call request 138 may indicate that the proxy call request 138 was sent from the voicebot call API 134 associated with the T2SNN platform 120.

In various embodiments, the operating environment 100 can include the call handling system 140 that can execute, host, or otherwise support a state aggregator 143 and a voicebot handler 144 via one or more instances of a processing unit, such as processor 141. Examples of instances of a processing unit, such as the processor 141, are provided in further detail below with respect to a processing unit in FIG. 6. In embodiments, the call handling system 140 can include a non-generic computer system that can be configured by execution of the state aggregator 143 and/or the voicebot handler 144. For example, in some embodiments, the call handling system 140 can be provided as one or more instances of a server, and thus in some embodiments may be referred to as a call handling server system. In some embodiments, at least some of the call handling system 140 can be provided and/or hosted by virtual processing and memory resources and/or physical processing and memory resources. The call handling system 140 can include a computer storage medium, such as a memory 142. The memory 142 can store at least a portion of the state aggregator 143, the voicebot handler 144, and/or other data and information discussed herein. In some embodiments, the memory 142 can provide the community bot registry 150, which is further discussed below. In some embodiments, the memory 142 can include volatile and/or non-volatile memory implemented in any method or technology for storage of information such as computer-readable instructions, data structures, program modules, or other data disclosed herein. In some embodiments, the memory 142 can be referred to as a "computer storage medium." It is understood that, in the claims, use of the terms "memory" and "computer storage medium" (and variations thereof, such as computer-readable storage medium) do not include, and shall not be construed to include, a wave or a signal per se and/or communication media.

The call handling system 140 can be in communication with one or more devices, such as but not limited to, the network 102, the IMS 104, the PCSCF 106, the community bot registry 150, the T2SNN platform 120, the UE 110A, the called target device 160, the nefarious UE 110B, or any other device or computing system that can be included in the operating environment 100. In some embodiments, the call handling system 140 may be configured as a physical computing system (e.g., a server that supports a back-end cloud network, a removable dongle, an access point, a network edge device, etc.) and/or a virtual computing system (e.g., a virtual server or other virtual machine that is hosted by one or more computing system). In some embodiments, the call handling system 140 can be communicatively located downstream of the network 102 and upstream of one or more target devices involved in the proxy voice call 170, such as the called target device 160. The call handling system 140 can be configured according to an embodiment of a computer system discussed with respect to FIG. 6. It should be understood that the examples provided are for illustration purposes only, and therefore should not be construed as limiting in any way.

In various embodiments, the voicebot handler 144 can monitor and analyze various requests for voice calls, and already established voice calls, being routed through the network 102, such as one or more instances of the proxy call request 138 and the proxy voice call 170. In some embodiments, the voicebot handler 144 of the call handling system 140 can configure the PCSCF 106 to reroute or redirect instances of the proxy call request 138 to the call handling system 140. By this, the call handling system 140 can intercept instances of the proxy call request 138. In some embodiments, the call handling system 140 can intercept instances of the proxy call request 138 based on the proxy call request 138 being routed from the voicebot 122A. In some embodiments, the voicebot handler 144 can intercept various call requests, irrespective of whether the call request is an instance of the proxy call request 138. The voicebot handler 144 can determine whether the call request is generated by a voicebot, such as based on the call request coming from the voicebot call API 134 and/or the call request indicating information associated with a voicebot, such as the VB ID 136A. If the call request includes the VB ID 136A or otherwise is determined to be from the T2SNN platform 120, the call request can be designated as an instance of a proxy call request generated by a voicebot, such as the proxy call request 138 generated by one of the voicebots 122A-N. In some embodiments, the voicebot handler 144 can (temporarily in some instances) suspend or otherwise withhold the proxy call request 138 from being routed or otherwise delivered to the called target device 160. For example, the voicebot handler 144 can create a call request holding queue that temporarily suspends the proxy call request 138 in the memory 142 while further analysis is provided so as to determine whether the proxy voice call 170 should be allowed to proceed. The voicebot handler 144 can communicate and/or invoke execution of the state aggregator 143, which in turn can access or otherwise obtain the community bot registry 150 so as to provide analysis and determine whether the voicebot which generated the proxy call request 138 (e.g., the voicebot 122A) is and/or should be permitted to contact the called target device 160 for establishment of the proxy voice call 170.

In various embodiments, the state aggregator 143 can use information included in the proxy call request 138, such as but not limited to the VB ID 136A, the UE ID 118A, the CT ID 137, and any other information discussed herein to determine an identity of the voicebot which generated the proxy call request 138, and whether that voicebot is authorized to contact the called target device 160. In various embodiments, authorization as to whether the voicebot (e.g., the voicebot 122A) is permitted to contact the called target device 160 may be indicated in the community bot registry 150, and the authorization may have been given by the call handling system 140 and/or by the called target device 160. In some embodiments, the state aggregator 143 can access the community bot registry 150 and determine a correlation between the VB ID 136A and the UE ID 118A from the proxy call request 138. In some embodiments, the VB ID 136A may identify an identity of the neural vocoder 124 (and/or an identity of the corresponding voicebot itself, such as voicebot 122A), and when combined with the UE ID 118A, the state aggregator 143 can reference a voicebot historical interaction map 152A-N. The voicebot historical interaction map 152A-N can store one or more instances of voicebot interaction records 165, which also may be stored or otherwise provided to the called target device 160. In various embodiments, the community bot registry 150 (e.g., via the voicebot historical interaction map 152A-N) can indicate the number of times that a particular voicebot has attempted to call the called target device 160 and/or other devices, the duration of the calls, the content of the calls, how many calls where allowed to be established, and how many call requests were denied.

In some embodiments, the community bot registry 150 can include further information about patterns and parameters exhibited by a particular voicebot within a portion of a proxy voice call (e.g., the voicebot data stream 172 of the proxy voice call 170). For example, the community bot registry 150 can indicate (e.g., via the voicebot historical interaction map 152A-N) voicebot information such as the cadence of speech from the voicebot, speech latency (i.e., the timing of speech phrases from the voicebot), keywords, repeated phrases, dialect identity, language identity, gender identity, pitch, tone, speech disfluencies, or other information by which a particular voicebot can be identified. Thus, even if the proxy call request 138 lacks an instance of the VB ID 136A, the state aggregator 143 can use the community bot registry 150 to analyze the voicebot data stream 172 portion of the proxy voice call 170 to determine the identity of the particular voicebot participating in the call. After determining the identity of the voicebot that is requesting and/or engaging in the proxy voice call 170, the state aggregator 143 can generate a bot registry update, such as a bot registry update 145, to indicate which voicebot (e.g., the voicebot 122A) is requesting and/or is engaging in the proxy voice call 170. In some embodiments, an instance of the bot registry update 145 may be provided to the called target device 160, which may store information included in the bot registry update 145 in an isolated bot registry 167, which is discussed in further detail below.

In various embodiments, the call handling system 140 can determine whether to allow the proxy call request 138 to be released, forwarded, or otherwise provided to the called target device 160 so as to establish the proxy voice call 170.

In some embodiments, the state aggregator 143 may, or may not, allow the proxy call request 138 to be provided to the called target device 160 based on the particular voicebot that is making the request, such as the voicebot 122A. For example, in an embodiment, whenever the UE 110A authorizes the voicebot 122A to generate the proxy call request 138 on behalf of the UE 110A, the purpose is not nefarious, and thus previous instances of the proxy voice call 170 were legitimate, as indicated by the voicebot historical interaction map 152A-N of the community bot registry 150 which informs the state aggregator 143 that one or more historical proxy voice calls were not nefarious (i.e., were not attempts to compromise the integrity of the called target device 160 and/or associated computing resources of the called target device 160). However, in another embodiment, the state aggregator 143 may determine that whenever the nefarious UE 110B authorizes one of the voicebots 122A-N to generate one or more of proxy call requests 184A-N on behalf of the nefarious UE 110B, the purpose of each of the proxy call requests 184A-N is nefarious because the voicebot historical interaction map 152A-N (and/or one or more instances of the voicebot interaction records 165) show that the corresponding voicebot (e.g., voicebot 122N) has either made previous attempts and/or has engaged in instances of one or more proxy voice call 170 that were for nefarious purposes, such as attempts to induce a proxy voice call swarm 182 where the called target device 160 becomes overwhelmed with call requests such that one or more resources of the called target device 160 is burdened, malfunctions, or is otherwise harmed. In some embodiments, the nefarious UE 110B may attempt to have the T2SNN platform 120 generate the proxy voice call swarm 182 by sending a proxy call swarm instruction 180, which indicates multiple instances of contextual information that causes concurrent proxy call requests 184A-N to be generated by one or more voicebots 122A-N on behalf of the nefarious UE 110B and the second user 108B. As such, in various embodiments, the call handling system 140 can intercept any and/or all of the proxy call requests 184A-N, determine that an attempt to generate the proxy voice call swarm 182 is occurring, and prevent the proxy call requests 184A-N from reaching the called target device 160, thereby improving communications network security and reducing cyber threats to the network 102.

In some embodiments, the call handling system 140 can generate a voicebot confirmation request 154. In some embodiments, the voicebot confirmation request 154 can inform the called target device 160 that a proxy call request, such as the proxy call request 138, has been made from a voicebot on behalf of a device (e.g., the voicebot 122A on behalf of the UE 110A). The voicebot confirmation request 154 can request whether the called target device 160 will give permission and/or authorization to engage in a proxy voice call with a voicebot, thereby allowing the proxy call request 138 to be released and provided to the called target device 160 for establishment of the proxy voice call 170. In some embodiments, the voicebot confirmation request 154 can identify the voicebot that generated the proxy call request 138, such as by including the VB ID 136A associated with the voicebot 122A. In some embodiments, the voicebot confirmation request 154 can indicate that a voicebot was used to generate the proxy call request 138, but may not specifically indicate the identity of the voicebot that was used to generate the proxy call request 138. Thus, the called target device 160 can determine whether to allow the proxy call request 138 to be forwarded and establish the proxy voice call 170 so that the call handling system 140 can determine the identity of the voicebot during the proxy voice call 170 and inform the called target device 160 of the identity of the voicebot based on the voicebot data stream 172 of the proxy voice call 170. The voicebot confirmation request 154 can include an instance of the UE ID 118A that is associated with the UE 110A which authorized the proxy call request 138, thereby allowing the called target device 160 to determine the identity of the UE which authorized a voicebot to generate the proxy call request 138. In some embodiments, the voicebot confirmation request 154 can include a bot registry pointer 155. The call handling system 140 can generate the bot registry pointer 155 so as to enable the called target device 160 to access the community bot registry 150. The called target device 160 can be instructed by the bot registry pointer 155 to obtain one or more instances of the voicebot interaction records 165 that can be stored in the isolated bot registry 167 and analyzed by the called target device 160 to independently validate whether the voicebot which generated the proxy call request 138 (e.g., the voicebot 122A) should be permitted to engage in the proxy voice call 170 with the called target device 160.

In various embodiments, the operating environment 100 can include one or more instances of the called target device 160. The called target device 160 can be configured as a communication device, a computing system, or other device that is configured to engage in voice calls directly with a user equipment (e.g., the UE 110A) and/or proxy voice calls with a voicebot (e.g., the proxy voice call 170 with the voicebot 122A). The called target device 160 may be configured as a communication device, such as according to an embodiment discussed with respect to FIG. 7. In some embodiments, the called target device 160 can include (and/or have access to via a cloud service) an answering voicebot 162, an interactive voice recognition system ("IVRS") 163, a voicemail system 164, and/or an instance of the vocoder 113. In some embodiments, the answering voicebot 162 can be configured to operate substantially similar to one or more of the voicebots 122A-N of the T2SNN platform 120 such that the answering voicebot 162 can engage in proxy voice calls on behalf of the called target device 160. Thus, in some embodiments, the proxy voice call 170 may be between one of the voicebots 122A-N and the answering voicebot 162. The answering voicebot 162 may be configured to execute locally on the called target device 160 and/or remotely via a service. For example, in an embodiment, the answering voicebot 162 may point, and serve as a pass-through API, to the T2SNN platform 120 which supports the answering voicebot 162 in how to formulate and generate the answer data stream 174. In various embodiments, the answer data stream 174 is generated by the called target device 160 in response to one or more data packets from the voicebot data stream 172 (e.g., generated by the voicebot 122A) during the proxy voice call 170. In some embodiments, the answer data stream 174 may be generated based on input and/or information from one or more of the answering voicebot 162, the IVRS 163, the voicemail system 164, and/or the called party 108C. The IVRS 163 can engage in an interactive voice conversation with the voicebot 122A, however the IVRS 163 is configured with a static conversation script. For example, the IVRS 163 may present a pre-recorded script and request the voicebot 122A to input a number based on options provided (e.g., "if you are calling about option 1, press 1 now," etc.) and/or provide vocal input (e.g., "if you are calling to schedule an appoint, state your name and desired time of appointment," etc.). Thus, the IVRS 163 is distinct from the capabilities and functions of the voicebots 122A-N and/or the answering voicebot 162 because the IVRS 163 does not engage in a natural language conversation and limits the conversation to a defined set of pre-recorded questions, answers, and/or statements. The voicemail system 164 may enable the proxy voice call 170 to occur but without substantial back-and-forth conversation between the voicebot 122A and the voicemail system 164. This is because the voicemail system 164 may initially generate the answer data stream 174 informing the voicebot 122A to "leave a message after the tone" or any other pre-recorded voice prompt. The voicebot engaging in the proxy voice call 170 (e.g., the voicebot 122A) can engage with any of the possible answering mechanisms executed by the called target device 160. In some embodiments, the called party 108C may answer the proxy call request 138, and the called target device 160 may invoke an instance of the vocoder 113 that is stored on the called target device 160 to transform and compress the vocal speech from the called party 108C into the answer data stream 174, and the voicebot 122A can respond and engage in a natural language conversation by engaging in the proxy voice call 170 via the voicebot data stream 172.

In some embodiments, the called target device 160 can receive the voicebot confirmation request 154 from the call handling system 140. In an embodiment, the called target device 160 can present the called party 108C with options to indicate whether the voicebot which generated the proxy call request 138 is permitted to engage in the proxy voice call 170 with the called target device 160. In some embodiments, the called party 108C can provide input indicating whether permission is granted or denied. In some embodiments, the answering voicebot 162 can receive the voicebot confirmation request 154. In some embodiments, the answering voicebot 162 can perform independent validation of whether the voicebot 122A is permitted to engage in a proxy voice call with the called target device 160. For example, in some embodiments, the called target device 160 can store one or more voicebot interaction records, such as the voicebot interaction records 165, in the isolated bot registry 167. The isolated bot registry 167 can store identities of voicebots and user equipment such that when a particular voicebot and user equipment are paired together (i.e., where the voicebot seeks to engage in a proxy voice call on behalf of the user equipment), then the isolated bot registry 167 can indicate whether the answering voicebot 162 should allow the proxy voice call 170 to proceed with the called target device 160. In some embodiments, where a voicebot is unknown to the answering voicebot 162, the answering voicebot 162 may invoke the bot registry pointer 155 that instructs and causes the answering voicebot 162 to obtain one or more instances of the voicebot interaction records 165 from the community bot registry 150. The called target device 160 can include one or more voicebot authorization parameters 166 that define a set of rules and/or thresholds by which a voicebot must adhere to in order to be validated as a voicebot that is allowed to engage in proxy voice calls with the called target device 160. For example, the voicebot authorization parameters 166 may require that a voicebot which generated the proxy call request 138 is used by a corresponding UE (e.g., the UE 110A) not more than once per week, month, or other defined time period. By way of example, the user 108A may use the voicebot 122A to call the called target device 160 every time (or at a defined time interval) a bill or invoice is due, where the voicebot 122A attempts to negotiate a discount or lower price on the invoice. Thus, the answering voicebot 162 may use the voicebot interaction records 165 to check the content of previous, historical conversations that involve a particular voicebot-UE pair, so as to allow the answering voicebot 162 to independently verify and validate whether the proxy call request 138 should be allowed to be routed to the called target device 160 and the proxy voice call 170 be established.

In various embodiments, the called target device 160 can generate a voicebot confirmation response 156 that indicates whether or not the voicebot (e.g., the voicebot 122A) is permitted to contact the called target device 160. In turn, the call handling system 140 can use the voicebot confirmation response 156 to determine whether the proxy call request 138 should be routed to the called target device 160 and the proxy voice call 170 be established, or to suppress and prevent the proxy call request 138 from reaching the called target device 160, thereby preventing the proxy voice call 170 from being established between the called target device 160 and the corresponding voicebot (e.g., the voicebot 122A). In various embodiments, the answering voicebot 162 of the called target device 160 can generate an instance of the bot registry update 145 that can be provided to the community bot registry 150. In some embodiments, the answering voicebot 162 can create one or more instances of the voicebot interaction records 165 based on the proxy voice call 170. For example, the answering voicebot 162 can indicate whether the voicebot 122A should continue to be allowed to contact the called target device 160 for a particular UE (e.g., the UE 110A). In some embodiments, the voicebot interaction records 165 and/or the bot registry update 145 can include call detail records about the proxy voice call 170, content of the proxy voice call 170, and/or any other information that can be used to update the community bot registry 150. It is understood that the community bot registry 150 can be accessed by a plurality of various called target devices so that voicebots can be logged and identified as to whether they are used for nefarious purposes or legitimate purposes. It should be understood that the examples provided are for illustration purposes only, and therefore should not be construed as limiting in any way.

It is understood that FIG. 1 illustrates one instance of the network 102, the IMS 104, the PCSCF 106, the user 108A, the second user 108B, the called party 108C, the UE 110A, the nefarious UE 110B, the contextual input message 114, the text strings 116, the T2SNN platform 120, the voicebots 122A-N, the neural vocoder 124, the neural network 126, the ASR microservice 128, the T2S engine 130, the proxy call service 132, the voicebot call API 134, the proxy call request 138, the VB IDs 136A-N, the UE IDs 118A-N, the CT ID 137, the call handling system 140, the state aggregator 143, the voicebot handler 144, the processor 141, the memory 142, the bot registry update 145, the community bot registry 150, voicebot historical interaction map 152A-N, the voicebot confirmation request 154, the bot registry pointer 155, voicebot confirmation response 156, the called target device 160, the answering voicebot 162, the IVRS 163, the voicemail system 164, the voicebot interaction records 165, the voicebot authorization parameters 166, the isolated bot registry 167, the proxy voice call 170, the voicebot data stream 172, the answer data stream 174, the proxy call swarm instruction 180, the proxy voice call swarm 182, and the proxy call requests 184A-N. It should be understood, however, that various implementations of the operating environment 100 can include zero, one, or more than one instances of these elements of the operating environment 100 shown in FIG. 1. As such, the embodiment of the operating environment 100 shown in FIG. 1 is understood to be illustrative and should not be construed as being limiting in any way.

Figure 2B:
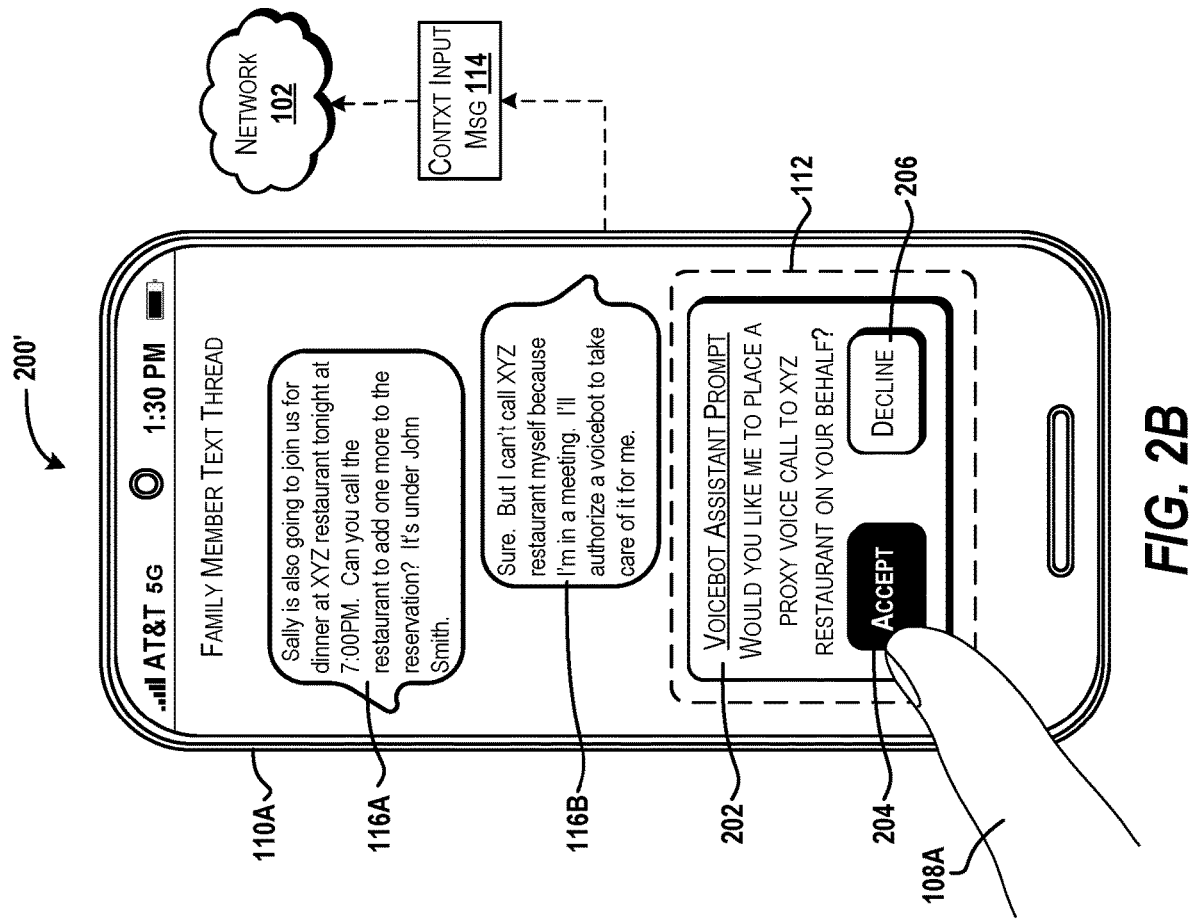
FIG. 2B is a user interface diagram showing another example screen display in which a proxy voice call may be authorized, according to an illustrative embodiment of the concepts and technologies described herein.
Figure 2A:
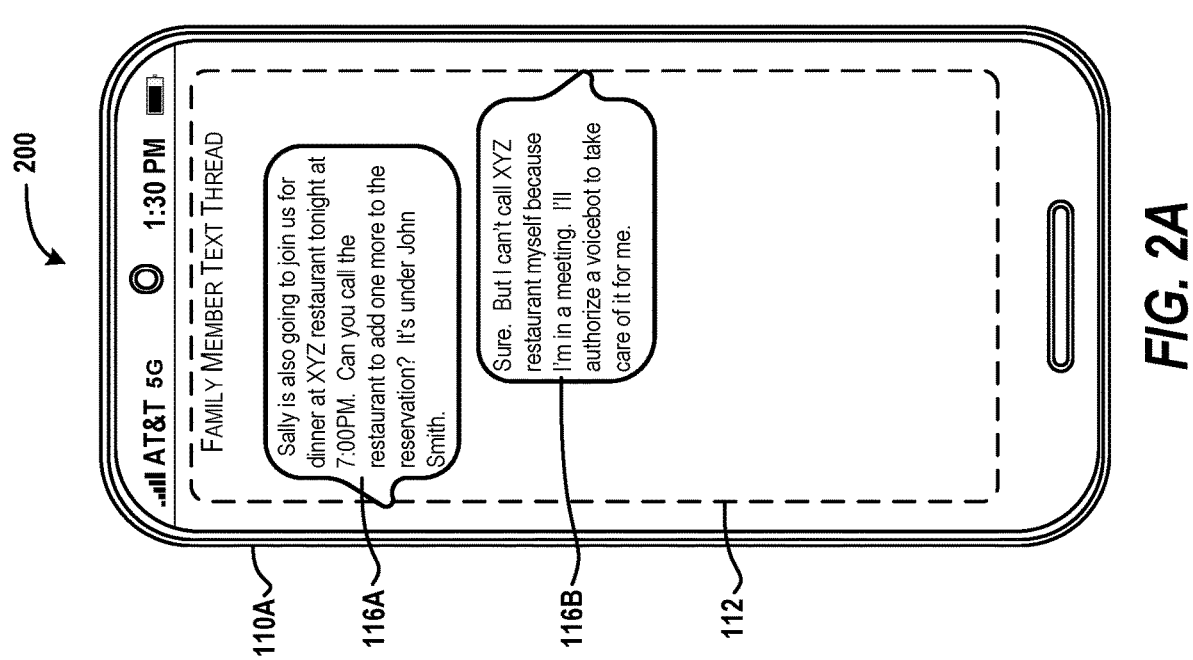
FIG. 2A is a user interface diagram showing an example screen display in which contextual information for use in a proxy call request is provided, according to an illustrative embodiment of the concepts and technologies described herein.

Turning now to FIGS. 2A-B with continued reference to FIG. 1, various instances of a user interface ("UI") diagram showing an example screen display that is associated with embodiments of the present disclosure will be discussed, according to an illustrative embodiment of the concepts and technologies described herein. FIG. 2A provides a UI diagram 200 showing an example in which contextual information is obtained from the UE 110A. As shown in FIG. 2A, the UE 110A may execute the voicebot tool 112 as a background process, where the voicebot tool 112 may monitor and analyze one or more text strings that are input into the UE 110A, such as any of the text strings 116A and 116B. By way of example, the UI diagram 200 illustrates a family member text message thread in which a user (e.g., the user 108A) provides input to the UE 110A such that the text string 116B is generated in response to the UE 110A receiving the text strings 116A from another device. It is understood that the UE 110A may have generated the text strings 116B based on the user speaking into a microphone of the UE 110A and/or via a display device that captures touch input from the UE 110A. In various embodiments, the voicebot tool 112 may be triggered based on keywords, phrases, or other input by the user 108A so as to seek authorization to use the proxy call service 132, such as shown in FIG. 2B. FIG. 2B provides an instance of the UI diagram 200' which may occur at a point in time later than that shown in FIG. 2A. As shown in FIG. 2B, the voicebot tool 112 can be triggered to launch and create a voicebot assistant prompt 202 based on the text strings 116B. The voicebot tool 112 can determine that the text string 116B is associated with an operation that can be performed by using the proxy call service 132, such as one of the voicebots 122A-N generating a proxy call request to establish a proxy voice call on behalf of the UE 110A. As such, the voicebot tool 112 can create one or more option input buttons to indicate whether the user 108A authorizes a proxy voice call to occur on behalf of the UE 110A, such as shown by an accept button 204, or the user 108A denies or otherwise does not authorize a proxy voice call to occur, such as shown by a decline button 206. In an embodiment where the user 108A allows a voicebot (e.g., the voicebot 122A) to request establishment of a proxy voice call on behalf of the UE 110A to accomplish a call operation associated with the text string 116B (e.g., using the proxy voice call to schedule an appointment on behalf of the user 108A), then the voicebot tool 112 can generate the contextual input message 114 that can include the relevant text strings, such as one or more of the text strings 116A and 116B. The voicebot tool 112 can direct the contextual input message 114 to the T2SNN platform 120 via the network 102. In some embodiments, the contextual input message 114 may be so that the proxy call service 132 is used for nefarious purposes, such as attempting to overload an intended target device with multiple proxy call requests concurrently. It should be understood that the examples provided are for illustration purposes only, and therefore should not be construed as limiting in any way.

It should be appreciated that the UI diagrams illustrated in FIGS. 2A-2B are provided for illustration purposes to provide one contemplated example of the UIs that can be generated and/or displayed in accordance with the concepts and technologies disclosed herein, and therefore should not be construed as being limited in any way. The buttons, controls, displays, and/or other information shown in the embodiments of UI diagrams 200 and 200' are illustrative and can include various menus, options, fields, buttons, or other information not shown in FIGS. 2A-2B. Because additional or alternative buttons and information can be included in the screen displays of the UI diagrams 200 and 200' it should be understood that the example embodiments shown in FIGS. 2A-2B are illustrative and therefore should not be construed as limiting in any way.

Figure 3:
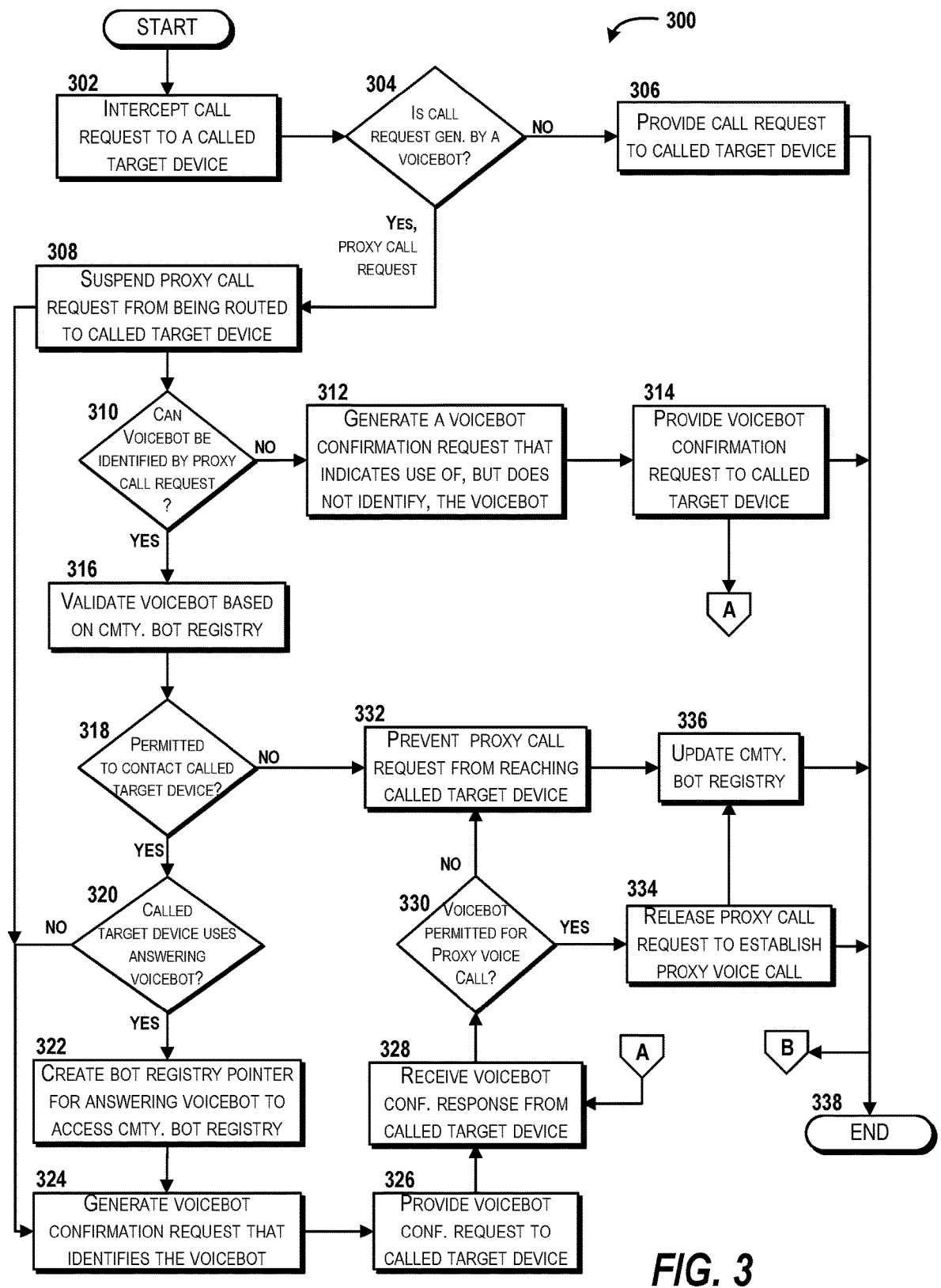
FIG. 3 is a flow diagram showing aspects of a method for network communication security for proxy voice calls, according to an illustrative embodiment of the concepts and technologies described herein.
Figure 4A:
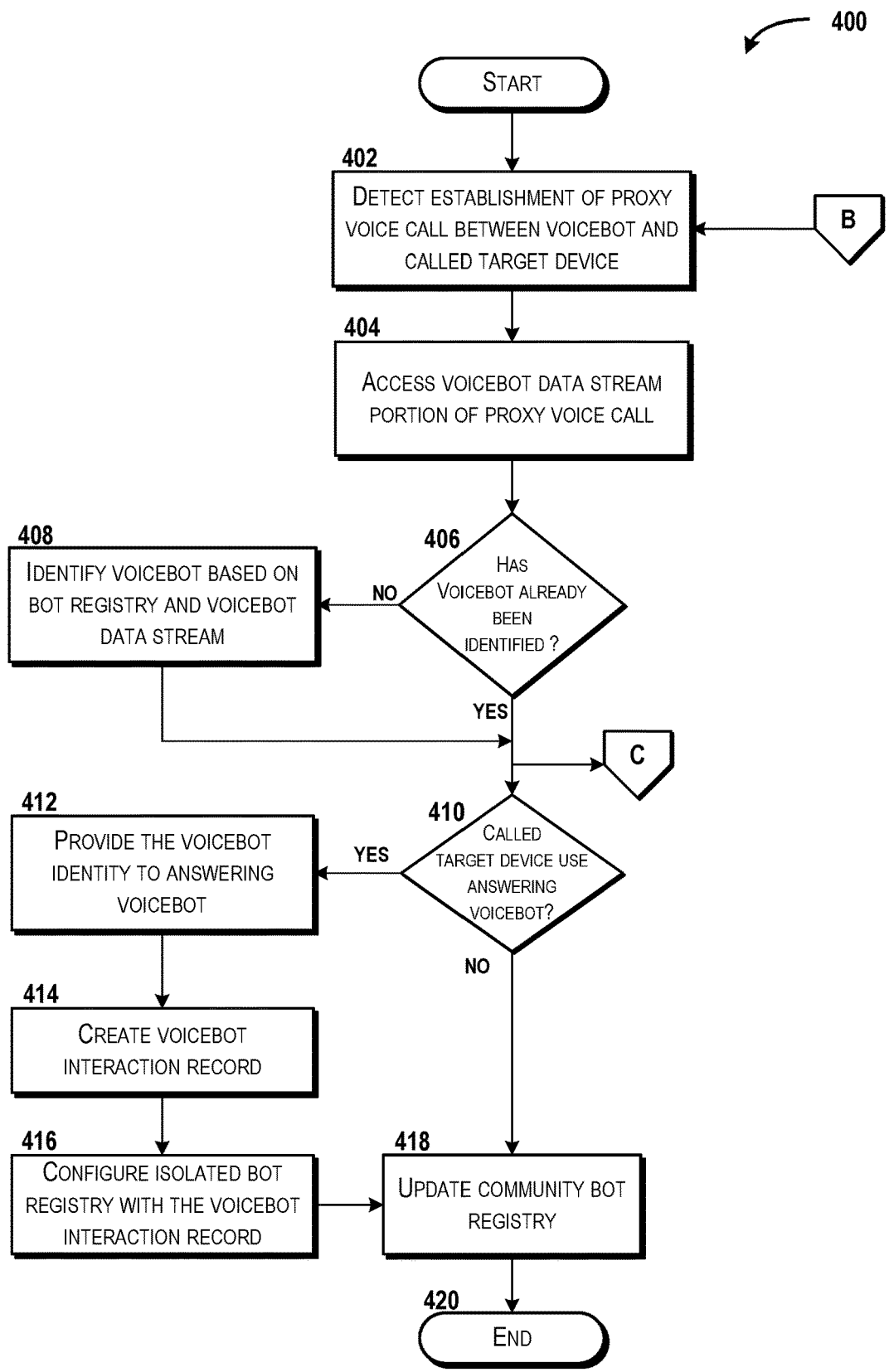
FIG. 4A is a flow diagram showing aspects of a method for providing network communication security during proxy voice calls, according to an illustrative embodiment of the concepts and technologies described herein.
Figure 4B:
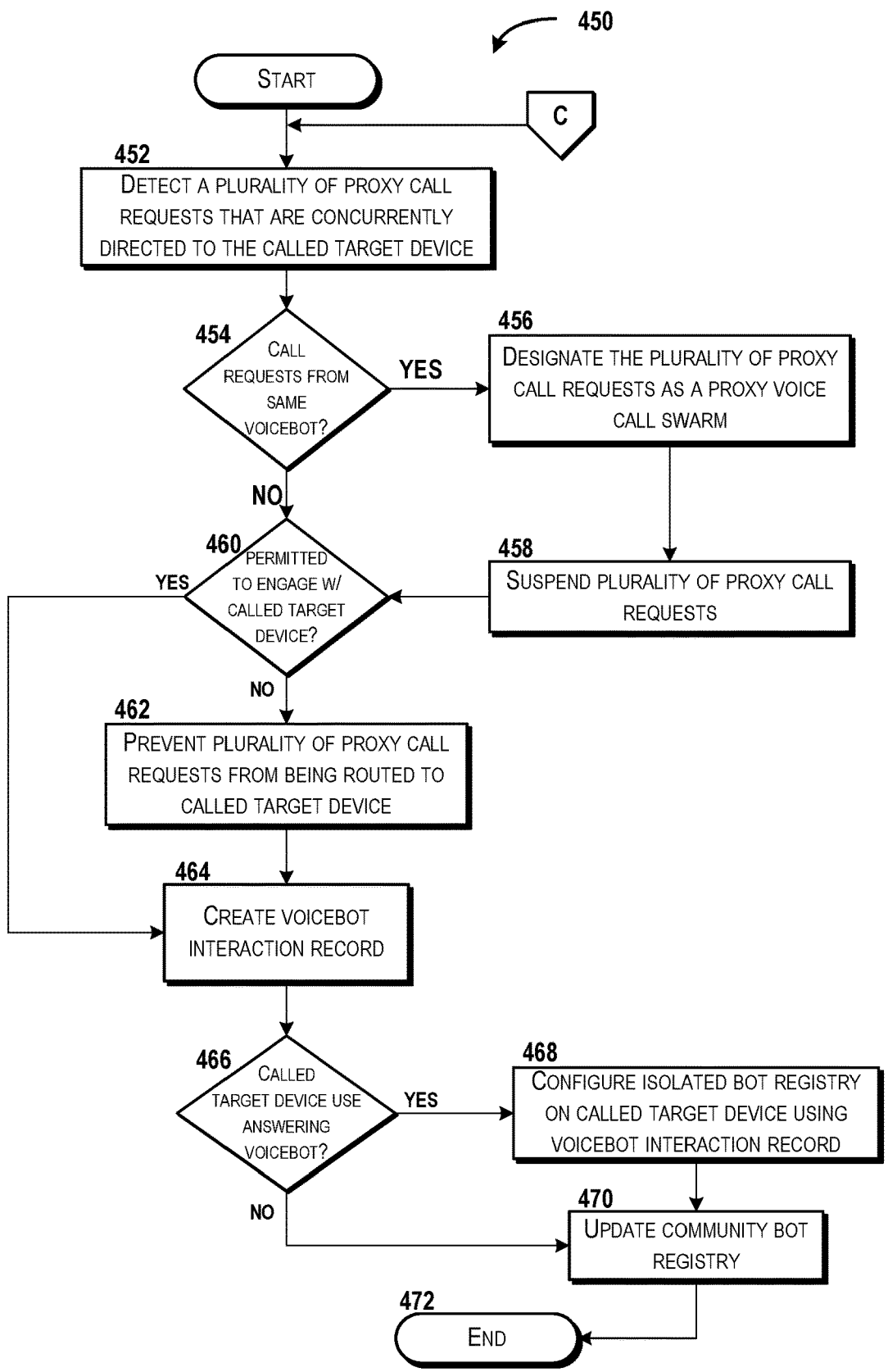
FIG. 4B is a flow diagram showing aspects of another method for providing network communication security during a proxy voice call swarm, according to an illustrative embodiment of the concepts and technologies described herein.

Regarding FIG. 3 and FIGS. 4A-4B, aspects of methods associated with communications network security for proxy voice calls that include a voicebot will be described in detail, according to one or more illustrative embodiment. Specifically, FIG. 3 shows a method 300 for network communication security for proxy voice calls, according to an illustrative embodiment. FIG. 4A refers to a method 400 for providing network communication security during proxy voice calls, according to an illustrative embodiment. FIG. 4B refers to a method 450 for providing network communication security during a proxy voice call swarm from one or more voicebots, according to one or more illustrative embodiment. It should be understood that the operations of the methods disclosed herein (e.g., the methods 300, 400, and 450) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein. It is understood that operations shown in one method may be performed in another method. It is also understood that aspects of the discussion with respect to FIG. 1 and FIGS. 2A-2B may also be included in a method, according to the concepts and technologies discussed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Therefore, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the call handling system 140, to perform one or more operations and/or causing the processor to direct other components of the computing system or device to perform one or more of the operations.

For purposes of illustrating and describing the concepts of the present disclosure, the method 300 disclosed herein is described as being performed by the call handling system 140 via execution of one or more computer-readable instructions such as, for example, the state aggregator 143 and/or the voicebot handler 144 that configure one or more processors, such as one or more instances of the processor 141. It should be understood that additional and/or alternative devices can provide the functionality described herein via execution of one or more modules, applications, and/or other software including, but not limited to, the answering voicebot 162 and/or the voicebot tool 112 that can execute and configure a device, such as but not limited to the UE 110A, the called target device 160, and/or another device discussed herein. Thus, the illustrated embodiments are illustrative, and should not be viewed as being limiting in any way.

Turning now to FIG. 3, aspects of the method 300 for network communication security for proxy voice calls will be discussed, according to an embodiment. The method 300 can begin and proceed to operation 302, where the call handling system 140 can intercept a call request from the network 102, where the call request is directed to the called target device 160. In various embodiments, the call handling system 140 may instruct the PCSCF 106 to redirect any call requests (whether they are proxy call requests or not) to the call handling system 140 for analysis.

From operation 302, the method 300 may proceed to operation 304, where the call handling system 140 can determine whether the call request was generated by a voicebot on behalf of user equipment. For example, when a call request is generated by one of the voicebots 122A-N of the T2SNN platform 120, and not generated directly by the UE 110A, then the call request would be designated as a proxy call request, such as the proxy call request 138. In various embodiments, a call request that is generated directly by a UE, such as the UE 110A, would not be considered a proxy call request because the call request was generated from the UE 110A and not independently generated by a voicebot. In various embodiments, the proxy call request 138 can request establishment of a proxy voice call, such as the proxy voice call 170, between the voicebot 122A and the called target device 160. In various embodiments, the proxy voice call 170 does not connect the UE 110A to the called target device 160. In various embodiments, the UE 110A authorized establishment of the proxy voice call 170 but did not generate the proxy call request 138 for the called target device 160, specifically because the voicebot 122A independently generated the proxy call request 138 on behalf of the UE 110A.

In various embodiments, the call handling system 140 can determine that the call request is a proxy call request, such as the proxy call request 138, generated by the voicebot 122A based on determining that the neural vocoder 124 is invoked by the voicebot 122A. By invoking the neural vocoder 124, the proxy voice call 170 can be connected and engaged between the voicebot 122A and the called target device 160 without also connecting the UE 110A to the called target device 160. In some embodiments, the neural vocoder 124 is configured such that, when the proxy voice call 170 is occurring, the called party 108C associated with the called target device 160, the called target device 160 itself, and/or the answering voicebot 162 cannot detect that the proxy voice call 170 is connected to the voicebot 122A instead of the UE 110A. In some embodiments, the call handling system 140 may determine that the call request is a proxy call request (e.g., the proxy call request 138) based on the VB ID 136A included in the proxy call request 138.

In some embodiments, the call handling system 140 can determine that the call request was sent from voicebot call API 134, thereby indicating that the call request is a proxy call request that was generated by a voicebot, such as one of the voicebot 122A-N. In various embodiments, if a call request is generated directly from the UE 110A or otherwise does not use one of the voicebots 122A-N of the T2SNN platform 120, then the call request is not generated by a voicebot, and thus not considered a proxy call request. If a call request is not generated by a voicebot (and thus not a proxy call request), then the method 300 can proceed along the NO path to operation 338, via operations 306, discussed below. If a call request is generated by a voicebot (e.g., the voicebot 122A) and thus considered a proxy call request (e.g., the proxy call request 138), then the method 300 can proceed along the YES path to operation 308. For clarity, a discussion following the NO path to operation 306 is provided first, followed by a discussion following the YES path to operation 308.

From operation 304, the method 300 may proceed along the NO path to operation 306, where the call handling system 140 can provide the call request (which is not a proxy call request because the call request was not generated by a voicebot) to the called target device 160. From operation 306, the method 300 may proceed to operation 338, where the method 300 can end. In some embodiments, the method 300 may proceed from operation 306 to one or more operations discussed with respect to methods 400 and/or 450.

Returning to operation 304, the method 300 may proceed along the YES path to operation 308, where the call handling system 140 can suspend the proxy call request 138 from being routed to the called target device 160. The call handling system 140 can suspend and withhold the proxy call request 138 from being routed while the call handling system 140 performs analysis and testing prior to the proxy voice call 170 being established. In some embodiments, the method 300 may proceed from operation 308 to operation 324, which will be discussed below in further detail.

In some embodiments, the method 300 may proceed from operation 308 to operation 310, where the call handling system 140 can determine whether the voicebot that generated the proxy call request 138 can be identified from the proxy call request 138. For example, the call handling system 140 may identify whether the proxy call request 138 includes an instance of the VB ID 136A and/or whether the proxy call request 138 was sent from the voicebot call API 134. The call handling system 140 may access the community bot registry 150 to compare known voicebot identifiers (e.g., any of the voicebot IDs 136A-N) to the VB IS 136A in the proxy call request 138. If a match is found, then the call handling system 140 can successfully identify the voicebot prior to the proxy voice call 170 being established. In embodiments in which the voicebot 122A can be identified from the proxy call request 138, the method 300 can proceed along the YES path to operation 316. In embodiments in which the voicebot 122A cannot be identified from the proxy call request 138, the method 300 can proceed along the NO path to operation 312. For clarity purposes, a description of the method 300 proceeding along the NO path will be provided first, followed by a description of the method 300 proceeding along the YES path.

From operation 310, the method 300 may proceed along the NO path to operation 312, where the call handling system 140 can generate an instance of the voicebot confirmation request 154. In some embodiments, the voicebot confirmation request 154 may indicate that a voicebot was used to generate the proxy call request 138, but may not specifically identify the particular identity of the voicebot in use. As such, the call handling system 140 may defer identification of the voicebot at issue until the proxy voice call 170 is established, that is if the called target device 160 permits the proxy voice call 170 to be established. In some embodiments, the method 300 may proceed from operation 312 to operation 314, where the call handling system 140 can provide the voicebot confirmation request 154 to the called target device 160. The voicebot confirmation request 154 may request, from the called target device 160, whether the proxy call request 138 should be permitted to be routed to the called target device 160 so that the proxy voice call 170 can be established, despite the particular identity of the voicebot not being readily apparent prior to the proxy voice call 170. In some embodiments, the voicebot confirmation request 154 can provide an accept button that instructs the call handling system 140 to release the proxy call request 138 so as to establish the proxy voice call 170, and/or a deny button that instructs the call handling system 140 to prevent the proxy call request 138 from being routed to the called target device 160, thereby preventing or otherwise blocking the proxy voice call 170 from being established. In some embodiments, the method 300 may proceed from operation 314 to operation 328, which will be discussed below in further detail. In some embodiments, the method 300 may proceed from operation 314 to operation 338, where the method 300 may end.

Returning to operation 310, in some embodiments, the method 300 can proceed from operation 310 along the YES path to operation 316, where the call handling system 140 can validate whether the voicebot 122A (which was identified by the call handling system 140 prior to the proxy voice call 170 being established) is permitted to contact and engage in the proxy voice call 170 with the called target device 160. In some embodiments, validating whether the voicebot 122A is and/or should be permitted to contact the called target device 160 and engage in the proxy voice call 170 can be based at least on reference to the community bot registry 150. For example, in some embodiments, the call handling system 140 can perform baseline tests that can analyze transaction types performed by the voicebot 122A, number of transactions, frequency and/or time-of-day patterns, and/or a generated score corresponding to the likelihood that the voicebot 122A does or does not operate with malicious purpose when acting on behalf of the UE 110A (where the generated score may be referred to as a credence score).

From operation 316, the method 300 may proceed to operation 318, where the call handling system 140 can determine whether the voicebot 122A is permitted to contact the called target device 160 based on information and validation from the community bot registry 150. If the voicebot 122A that generated proxy call request 138 is permitted to contact the called target device 160 (e.g., based on the voicebot 122A not being used for malicious purposes when acting on behalf of the UE 110A), then the method 300 may proceed along the YES path to operation 320, which will be discussed below. If the voicebot 122A that generated the proxy call request 138 is not permitted to contact the called target device 160 (e.g., based on the voicebot 122A operating for malicious purposes when acting on behalf of the UE 110A), then the method 300 can proceed along the NO path to operation 332, which will be discussed below in further detail.

Considering operation 320 first, the call handling system 140 may determine whether the called target device 160 invokes or otherwise uses or includes an answering voicebot, such as the answering voicebot 162, to engage in the proxy voice call 170 on behalf of the called target device 160. In some embodiments, the community bot registry 150 may indicate whether the called target device 160 uses the answering voicebot 162. The call handling system 140 may use the CT ID 137 to identify the called target device 160 in the community bot registry 150, and in turn determine whether the answering voicebot 162 is present. In some embodiments, if the answering voicebot 162 is not used by the called target device 160, then the method 300 may proceed from operation 320 along the NO path to operation 324, which is discussed below in further detail.

If, on the other hand, an answering voicebot, such as the answering voicebot 162, is used by the called target device 160, then the method 300 may proceed along the YES path to operation 322, where the call handling system 140 may create an instance of the bot registry pointer 155. The bot registry pointer 155 can be configured to enable and instruct the answering voicebot 162 of the called target device 160 to access the community bot registry 150 so that the answering voicebot 162 can independently verify whether the voicebot 122A should be allowed to contact the called target device 160 on behalf of the UE 110A.

From operation 322, the method 300 may proceed to operation 324, where the call handling system 140 can generate the voicebot confirmation request 154. The voicebot confirmation request can identify the voicebot 122A that is requesting establishment of the proxy voice call 170 between the voicebot 122A and the called target device 160. In various embodiments, the bot registry pointer 155 may be included in the voicebot confirmation request 154. In some embodiments, the call handling system 140 can generate and/or provide an instance of the voicebot interaction record 165 in the voicebot confirmation request 154 for the called target device 160 to analyze. In some embodiments, the voicebot interaction record 165 can indicate and include historical call detail records pertaining to the voicebot 122A when the voicebot 122A acts on behalf of the UE 110A and requests establishment of the proxy voice call 170. The voicebot confirmation request 154 can enable the called target device 160 to accept or deny the establishment of the proxy voice call 170 based on the voicebot 122A operating on behalf of the UE 110A.

From operation 324, the method 300 may proceed to operation 326, where the call handling system 140 can provide the voicebot confirmation request 154 to the called target device 160. In some embodiments, the proxy call request 138 can be suspended (e.g., held within a proxy call request queue in the memory 142) while the voicebot confirmation request 154 is provided to the called target device 160 and until a voicebot confirmation response 156 is received in response to the voicebot confirmation request 154.

From operation 326, the method 300 may proceed to operation 328, where the call handling system 140 can receive an instance of the voicebot confirmation response 156 from the called target device 160. In some embodiments, the answering voicebot 162 of the called target device 160 may have performed independent verification and validation using the isolated bot registry 167, one or more voicebot interaction records 165, the voicebot authorization parameters 166, and/or information from the community bot registry 150 to determine whether to allow the voicebot 122A to engage in a proxy voice call with the called target device (and thus allow the proxy call request 138 to be released from the call handling system 140). In various embodiments, the voicebot confirmation response 156 can indicate whether the voicebot 122A is permitted to contact and engage in the proxy voice call 170 with the called target device 160, and thus whether the proxy call request 138 should be released or not.

From operation 328, the method 300 may proceed to operation 330, where the call handling system 140 can determine whether the voicebot 122A is permitted by the called target device 160 to engage in the proxy voice call 170. For example, the call handling system 140 can analyze the voicebot confirmation response 156 for indication as to whether the voicebot 122A is permitted to contact the called target device 160. If the voicebot 122A is permitted to contact the called target device 160 on behalf of the UE 110A, then the method 300 may proceed along the YES path to operation 334. If the voicebot 122A is not permitted to contact the called target device 160 on behalf of the UE 110A, then the method 300 may proceed along the NO path to operation 332. For clarity purposes, a discussion of the method 300 proceeding along the YES path will be provided first, followed by a discussion of the method 300 proceeding along the NO path.

From operation 330, the method 300 may proceed along the YES path to operation 334, where the call handling system 140 can release the proxy call request 138 and provide the proxy call request 138 to the called target device 160 so as to establish the proxy voice call 170 between the voicebot 122A and the called target device 160. In some embodiments, the proxy call request 138 can be released based on the answering voicebot 162 instructing, via the voicebot confirmation response 156, the call handling system to provide the proxy call request 138 to the called target device 160.

In some embodiments, from operation 334, the method 300 may proceed to operation 338, where the method 300 may end. In some embodiments where the method 300 proceeds from operation 334 to operation 336, the call handling system 140 may generate an instance of the bot registry update 145 indicating that the proxy call request 138 was allowed to proceed to the called target device 160 and the voicebot 122A was allowed to engage in a proxy voice call 170 with the called target device. The bot registry update 145 may include call detail records, such as time of call, date, duration, content of the proxy voice call 170, and/or other information prior to and/or during the proxy voice call 170.

Returning to operation 330, in some embodiments if the voicebot 122A is not permitted to contact the called target device 160 on behalf of the UE 110A, the method 300 may proceed along the NO path to operation 332. At operation 332, the call handling system 140 may prevent the proxy call request 138 from being routed to the called target device 160, such as because the voicebot 122A is not permitted or otherwise authorized to contact the called target device 160. In some embodiments where the method 300 proceeds from operation 332 to operation 336, the call handling system 140 can update the isolated bot registry 167 and/or the community bot registry 150. For example, the call handling system 140 can generate an instance of the bot registry update 145 based on the voicebot confirmation response 156 to indicate that the proxy call request 138 was prevented from being routed to the called target device 160 because the voicebot 122A was not permitted or otherwise authorized to contact the called target device 160 (which may be based on an instruction from the voicebot confirmation response 156). From operation 336, the method 300 may proceed to operation 338, where the method 300 may end. In some embodiments, the method 300 may proceed to one or more operations discussed with respect to FIGS. 4A-4B, according to an embodiment. It should be understood that these examples are illustrative and therefore should not be construed as being limiting in any way.

Turning now to FIG. 4A, aspects of the method 400 for providing network communication security during proxy voice calls will be discussed, according an embodiment. The method 400 can begin and proceed to operation 402, where the call handling system 140 can detect establishment of an instance of the proxy voice call 170 between the voicebot 122A and the called target device 160. In various embodiments, the voicebot 122A can be configured to engage in the proxy voice call 170 with the called target device 160 using the neural vocoder 124. The voicebot 122A is configured to engage in the proxy voice call 170 without reliance on the UE 110A executing the vocoder 113, where the vocoder 113 ordinarily would be required during direct voice calls between the UE 110A and the called target device 160 in order to provide speech encoding to capture audio input from the user 108A.

From operation 402, the method 400 may proceed to operation 404, where the call handling system 140 can access the voicebot data stream 172 portion of the proxy voice call 170. The voicebot data stream 172 corresponds with the audio data packets that the voicebot 122A generates so as to engage in a conversation with the called target device 160 during the proxy voice call 170. In some embodiments, the call handling system 140 may keep the privacy of the called target device 160 intact by not analyzing the answer data stream 174 portion of the proxy voice call 170.

From operation 404, the method 400 may proceed to operation 406, where the call handling system 140 can determine whether the voicebot 122A engaged in the proxy voice call 170 has already been identified. For example, if the VB ID 136A was included in the proxy call request 138 and the VB ID 136A indicated an identity of the voicebot 122A, then the voicebot 122A may have already been identified prior to establishment of the proxy voice call 170. If the voicebot 122A has already been identified, then the method 400 may proceed along the YES path to operation 410, which is discussed below. If the voicebot 122A has not yet been identified, but the proxy voice call 170 was allowed to be established, then the method 400 may proceed along the NO path to operation 408.

At operation 408, the call handling system 140 may identify the voicebot that is participating in the proxy voice call 170 based on analysis of one or more of the community bot registry 150 and/or the voicebot data stream 172 portion of the proxy voice call 170. For example, the call handling system 140 can perform natural language understanding analysis to detect repeated phrases, repeated timing, parametric format parameters, noiseless reconstruction factors (e.g., checking at the millisecond level for noiseless reconstruction), patterns in cadence and tone (e.g., determining whether there is a common up-pitch in the same manner that is unnatural), types of words and vocabulary level, or other baseline tests that can be implemented to identify the identity of the voicebot participating in the proxy voice call 170 on behalf of a user equipment (e.g., the UE 110A). Once the identity of the voicebot is determined, such as the VB ID 136A for the voicebot 122A, the method 400 may proceed to operation 410.

At operation 410, the call handling system 140 can determine whether the called target device 160 is using an instance of the answering voicebot 162 to participate in the proxy voice call 170. The call handling system 140 may determine whether the answering voicebot 162 is in use based on analysis of the answer data stream 174 and/or an indication within the community bot registry 150. In some embodiments, the call handling system 140 may determine that the called target device 160 is associated with one or more of the IVRS 163 and/or the voicemail system 164. In embodiments where the called target device 160 does not use the answering voicebot 162, the method 400 may proceed along the NO path to operation 418, where the call handling system 140 can update the community bot registry 150 by sending an instance of the bot registry update 145 indicating that only one voicebot (e.g., the voicebot 122A) is participating in the proxy voice call 170. In embodiments where the call handling system 140 determines that the called target device uses the answering voicebot 162, the method 400 may proceed along the YES path to operation 412.

At operation 412, the call handling system 140 can provide VB ID 136A associated with the voicebot 122A to the answering voicebot 162, so that the answering voicebot 162 can update the isolated bot registry 167.

From operation 412, the method 400 may proceed to operation 414, where the call handling system 140 can create an instance of the voicebot interaction record 165 based on the proxy voice call 170, where the voicebot interaction record 165 can provide call detail records about the proxy voice call 170 during and/or after the proxy voice call 170. In some embodiments, the voicebot interaction record 165 can indicate and include historical call detail records pertaining to the voicebot 122A that requested establishment of, and participated in, the proxy voice call 170.

From operation 414, the method 400 may proceed to operation 416, where the call handling system 140 can configure the isolated bot registry 167 with the voicebot interaction record 165 by sending the voicebot interaction record 165 to the answering voicebot 162. From operation 416, the method 400 may proceed to operation 418, where the call handling system 140 can update the community bot registry 150 based on the proxy voice call 170 being between the voicebot (e.g., the voicebot 122A) and the answering voicebot 162. It should be understood that the examples provided are for illustration purposes only, and therefore should not be construed as limiting in any way. From operation 418, the method 400 may proceed to operation 420, where the method 400 can end.

Turning now to FIG. 4B, aspects of the method 450 for providing network communication security during a proxy voice call swarm will be discussed, according another embodiment. It is understood that, in some embodiments, the method 450 may be performed with operations from one or more of the methods 300 and/or 400.

The method 450 can begin and proceed to operation 452, where the call handling system 140 can detect a plurality of proxy call requests that are concurrently directed to the called target device 160, such as the proxy call requests 184A-N operating on behalf of the nefarious UE 110B.

From operation 452, the method 450 may proceed to operation 454, where the call handling system 140 can determine one or more of whether the plurality of proxy call requests 184A-N were generated from the same voicebot and whether the proxy call requests 184A-N are operating on behalf of the same user equipment. In some embodiments, if the plurality of proxy call requests 184A-N were generated from one or more instances of the same voicebot (e.g., one or more instances of voicebots 122A-N) and were authorized to operate on behalf of the same user equipment (e.g., the nefarious UE 110B), then the method 450 may proceed along the YES path to operation 456. In some embodiments, if the plurality of proxy call requests 184A-N were not generated from one or more instances of the same voicebot (e.g., one or more instances of voicebots 122A-N) and were authorized to operate on behalf of the different user equipment (i.e., not authorized to operate on behalf of the same user equipment), then the method 450 may proceed along the NO path to operation 460, which will be discussed below in further detail. For clarity purposes, a discussion of the method 450 proceeding along the YES path will be provided first, followed by a discussion of the method 450 proceeding along the NO path.

In some embodiments, the method 450 may proceed from operation 454 along the YES path to operation 456, where the call handling system 140 can designate the plurality of proxy call requests 184A-N as an instance of the proxy voice call swarm 182. An instance of the proxy voice call swarm 182 occurs where two or more instances of a proxy call request occur concurrently while targeting the same called target device 160 so as to cause malicious or otherwise harmful effects to the called target device 160, where the proxy call requests 184A-N are generated by one or more instances of a voicebot (e.g., the voicebots 122A-N).

From operation 456, the method 450 may proceed to operation 458, where the call handling system 140 can intercept the plurality of proxy call requests 184A-N and suspend the plurality of proxy call requests 184A-N so as to prevent the proxy call requests 184A-N from being routed to the called target device 160. In some embodiments, the plurality of proxy call requests 184A-N are suspended temporarily for further analysis. From operation 458, the method 450 may proceed to operation 460, At operation 460, the call handling system 140 can determine whether the voicebot(s) that generated one or more of the proxy call requests (e.g., one or more of the voicebots 122A-N that generated one or more of the proxy call requests 184A-N) is/are permitted to contact and engage the called target device 160. In various embodiments, the call handling system 140 may reference one or more of the community bot registry 150 and/or the isolated bot registry 167. If the community bot registry 150 and/or the isolated bot registry 167 indicates that the voicebot(s) corresponding to one or more of the plurality of proxy call requests 184A-N is/are permitted to contact the called target device 160, then the method 450 can proceed along the YES path to operation 464, where the call handling system 140 can create an instance of the voicebot interaction record 165 to indicate that the plurality of proxy call requests 184A-N were allowed to proceed and connect to the called target device 160. If the community bot registry 150 and/or the isolated bot registry 167 indicates that the voicebot(s) corresponding to one or more of the plurality of proxy call requests 184A-N is/are not permitted to contact the called target device 160, then the method 450 can proceed along the NO path to operation 462, where the call handling system 140 can prevent the plurality of proxy call requests 184A-N from being routed or otherwise allowed to contact the called target device 160. In embodiments where the method 450 proceeds from operation 462 to operation 464, the call handling system 140 can create an instance of the voicebot interaction record 165 indicating that the plurality of proxy call requests 184A-N were blocked or otherwise prevented from contacting the called target device 160.

From operation 464, the method 450 may proceed to operation 466, where the call handling system 140 can determine whether the called target device 160 uses or otherwise includes an instance of the answering voicebot 162. The call handling system 140 may determine that the called target device 160 uses the answering voicebot 162 based on one or more of the community bot registry 150 and/or the isolated bot registry 167. If the called target device 160 does not use the answering voicebot 162, then the method 450 may proceed from operation 466 along the NO path to operation 470, where the call handling system 140 may update the community bot registry 150 using an instance of the voicebot interaction record 165 in an instance of the bot registry update 145. If the called target device 160 uses the answering voicebot 162, then the method 450 may proceed from operation 466 along the YES path to operation 468, where call handling system 140 can configure the isolated bot registry 167 by providing an instance of the voicebot interaction record 165 to the isolated bot registry 167. From operation 468, the method 450 can proceed to operation 470, where the call handling system 140 can update the community bot registry 150, such as by providing an instance of the voicebot interaction record 165 to the community bot registry 150 in an instance of the bot registry update 145.

From operation 470, the method 450 may proceed to operation 472, where the method 450 may end.

Figure 5:
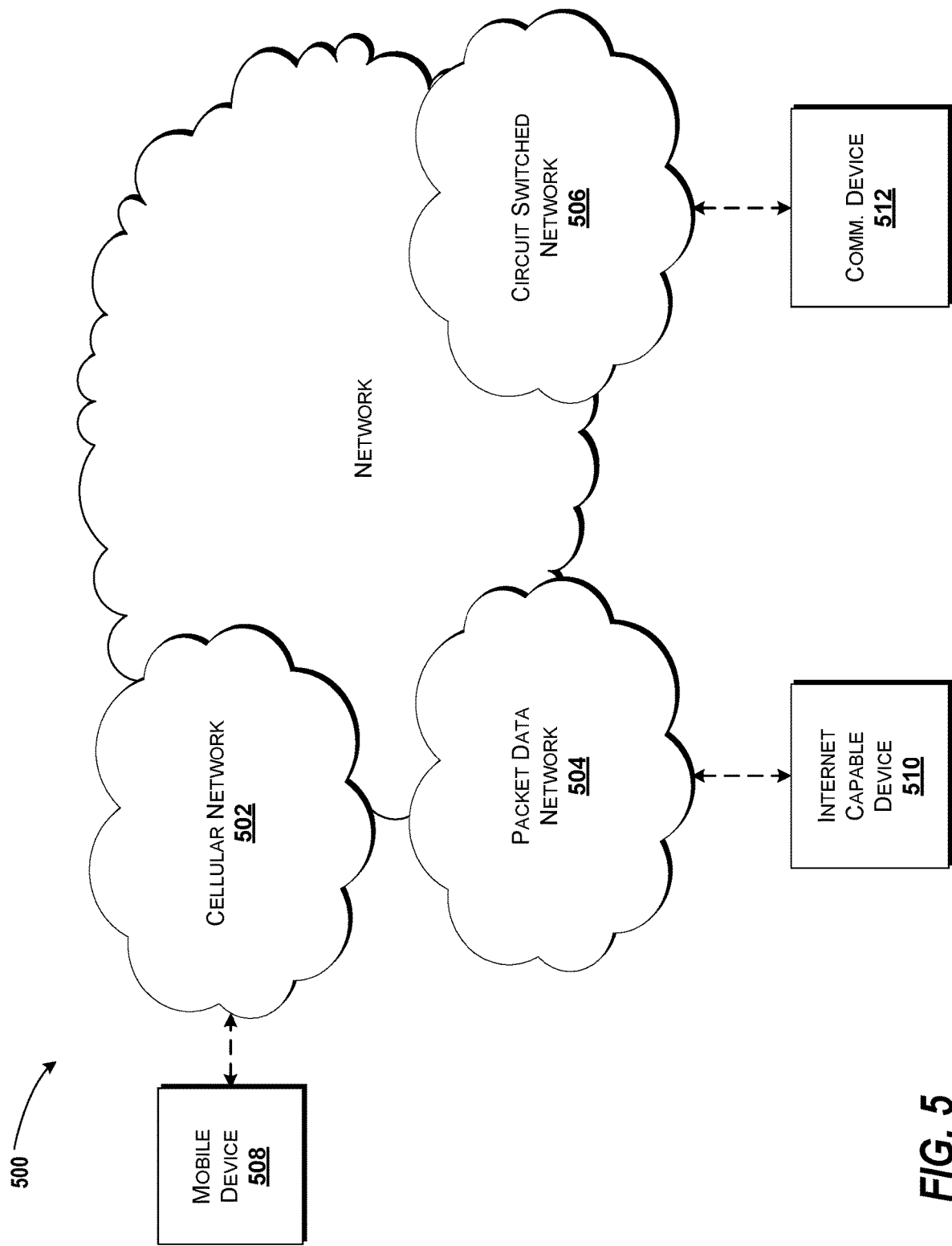
FIG. 5 schematically illustrates a network, according to an illustrative embodiment of the concepts and technologies described herein.

Turning now to FIG. 5, a discussion of a network 500 is illustrated, according to an illustrative embodiment. The network 102 shown in FIG. 1 can be configured substantially similar to include at least some of the elements of the network 500. The network 500 can include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also can be compatible with mobile communications standards such as but not limited to 4G, LTE, LTE Advanced, and/or 5G, as well as evolved and future mobile standards.

The packet data network 504 includes various devices, for example, servers, computers, databases, and other devices in communication with one another, as is generally understood. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" and/or "pointers" in the retrieved files, as is generally understood. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 102 and/or the network 500 refers broadly to any combination of the networks 502, 504, 506. It should be appreciated that substantially all of the functionality described with reference to the network 102 and/or the network 500 can be performed by the cellular network 502, the packet data network 504, and/or the circuit switched network 506, alone or in combination with other networks, network elements, and the like. Although not illustrated separately in FIG. 5, it should be understood that the IMS 104 can be a part of the cellular network 502, though this is not necessarily the case.

FIG. 6 is a block diagram illustrating a computer system 600 configured to provide the functionality described herein for providing network security for proxy voice calls, such as the proxy voice call 170, in accordance with various embodiments of the concepts and technologies disclosed herein. In some embodiments, the call handling system 140, the called target device 160, and/or the T2SNN platform 120 illustrated and described herein can be configured as and/or can have an architecture similar or identical to the computer system 600. In some embodiments, the UEs 110A and 110B can be configured as and/or have an architecture that is similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, the processor 141 can be configured substantially similar to the processing unit 602. In some embodiments, the memory 142 can be configured substantially similar to the memory 604. In various embodiments, one or more instances of the processing unit 602 and/or the memory 604 can be included in one or more of the UEs 110A and 110B, the T2SNN platform 120, the call handling system 140, and/or the called target device 160.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 can include the state aggregator 143, the voicebot handler 144, the voicebots 122A-N, the proxy call service 132, the T2S engine 130, the ASR microservice 128, the neural network 126, the neural vocoder 124, and/or other computer-readable instructions. These and/or other programs can be embodied in computer-readable media containing instructions that, when executed by the processing unit 602, perform one or more of the methods 300, 400, 450 described in detail above with respect to FIGS. 3 and 4A-4B. According to some embodiments, the program modules 616 may be embodied in hardware, software, firmware, or any combination thereof. It should be understood that the memory 604 also can be configured to store one or more instance of information discussed with respect to FIG. 1 and FIGS. 2A-2B, such as but not limited to the proxy call request 138, the VB IDs 136A-N, the UE IDs 118A-N, the voicebot historical interaction map 152A-N, the CT ID 137, the proxy call requests 184A-N, the contextual input message 114, the text strings 116, the voicebot confirmation request 154, the bot registry pointer 155, the bot registry update 145, the community bot registry 150, voicebot confirmation response 156, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrases "memory," "computer storage medium" (and variations thereof) does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as network 618. Examples of the network devices 610 include, but are not limited to, a modem, a radio frequency ("RF") or infrared ("IR") transceiver, a telephonic interface, a bridge, a router, or a network card. The network 618 may be configured substantially similar to the network 102 discussed with respect to FIG. 1. In some embodiments, the network 618 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 102 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Turning now to FIG. 7, an illustrative communication device 700 and components thereof will be described. In some embodiments, the UEs 110A, 110B, and the called target device 160, and/or other devices illustrated and described herein can be configured as and/or can have an architecture similar or identical to the communication device 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the communication device 700 can include a display 702 for presenting data and information. According to various embodiments, the display 702 can be configured to display various graphical user interface ("GUI") elements for presenting and/or modifying information associated with a custom private caller ID mask, creating private call instructions, presenting text, images, video, virtual keypads and/or keyboards, messaging data, notification messages, metadata, internet content, device status, time, date, calendar data, device preferences, map and location data, combinations thereof, and/or the like. The communication device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the voicebot tool 112, the answering voicebot 162, the vocoder 113, the IVRS 163, the voicemail system 164, and/or other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the communication device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, displaying a text string (e.g., the text strings 116A and 116B), configuring settings, manipulating address book content and/or settings, multi-mode interaction, interacting with other applications 710, and otherwise facilitating user interaction with the operating system 708, the applications 710, and/or other types or instances of data 712 that can be stored at the communication device 700, such as stored by the memory 706. According to various embodiments, the data 712 can include, for example, instances of the voicebot confirmation request 154, the bot registry pointer 155, the voicebot confirmation response 156, the voicebot interaction records 165, the voicebot authorization parameters 166, the isolated bot registry 167, the contextual input message 114, the text strings 116, the proxy call swarm instruction 180, the proxy voice call 170, the voicebot data stream 172, the answer data stream 174, any other elements discussed with respect to FIG. 1 and FIGS. 2A-2B, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The communication device 700 also can include an input/output ("I/O") interface 716. The I/O interface 716 can be configured to support the input/output of data such as for the contextual input message 114, the voicebot confirmation response 156, other information discussed with respect to FIG. 1, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the communication device 700 can be configured to synchronize with another device to transfer content to and/or from the communication device 700. In some embodiments, the communication device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the communication device 700 and a network device or local device.

The communication device 700 also can include a communications component 718. The communications component 718 can be configured to interface with the processor 704 to facilitate wired and/or wireless communications with one or more networks such as the network 102 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, LTE, LTE Advanced, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The communication device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the communication device 700 may be provided by an audio I/O component 726. The audio I/O component 726 of the communication device 700 can include one or more speakers for the output of audio signals, one or more microphones for the collection and/or input of audio signals, and/or other audio input and/or output devices.

The illustrated communication device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the communication device 700 are contemplated, it should be understood that these embodiments are illustrative, and should not be construed as being limiting in any way.

The communication device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The communication device 700 may also include a video system 734. The video system 734 can be configured to capture, process, record, modify, and/or store video content. Photos and videos obtained using the image system 732 and the video system 734, respectively, may be added as message content to an MMS message, email message, and sent to another communication device. The video and/or photo content also can be shared with other devices via various types of data transfers via wired and/or wireless communication devices as described herein.

The communication device 700 also can include one or more location components 736. The location components 736 can be configured to send and/or receive signals to determine a geographic location of the communication device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the communication device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the communication device 700. Using the location component 736, the communication device 700 can generate and/or receive data to identify its geographic location, or to transmit data used by other devices to determine the location of the communication device 700. The location component 736 may include multiple components for determining the location and/or orientation of the communication device 700.

The illustrated communication device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the communication device 700 can include additional and/or alternative components, the above embodiment should be understood as being illustrative of one possible operating environment for various embodiments of the concepts and technologies described herein. The described embodiment of the communication device 700 is illustrative, and should not be construed as being limiting in any way.

Based on the foregoing, it should be appreciated that systems and methods for communications network security for handling proxy voice calls have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or medium described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   intercepting, by a call handling system from a communications network, a call request that is directed to a called target device;
   determining, by the call handling system, that the call request was generated by a voicebot on behalf of a user equipment, wherein determining that the call request was generated by a voicebot on behalf of a user equipment comprises determining that the call request is from a text-to-speech neural network platform;
   in response to determining that the call request was generated by a voicebot on behalf of a user equipment, suspending, by the call handling system, the call request from being routed to the called target device; and
   while the call request is suspended,
      generating, by the call handling system, a voicebot confirmation request that identifies the voicebot and the user equipment, and
      providing, by the call handling system, the voicebot confirmation request to the called target device.

2. The method of claim 1, wherein the call request requests establishment of a proxy voice call between the voicebot and the called target device.

3. The method of claim 2, wherein the proxy voice call does not connect the user equipment to the called target device.

4. The method of claim 2, wherein the user equipment authorized establishment of the proxy voice call but did not generate the call request for the called target device.

5. The method of claim 1, further comprising:
  validating, by the call handling system, whether the voicebot is permitted to contact and engage in a proxy voice call with the called target device; and
  releasing, by the call handling system, the call request from suspension to establish the proxy voice call between the voicebot and the called target device.

6. The method of claim 5, wherein validating whether the voicebot is permitted to contact and engage in the proxy voice call with the called target device is based on a community bot registry.

7. The method of claim 5, further comprising determining, by the call handling system, that the called target device invokes an answering voicebot to engage in the proxy voice call, wherein releasing suspension of the call request is based on the answering voicebot of the called target device.

8. A system comprising:
  a processor; and
  a memory that stores computer-executable instructions that, in response to being executed by the processor, cause the processor to perform operations comprising:
    intercepting, from a communications network, a call request that is directed to a called target device,
    determining that the call request was generated by a voicebot on behalf of a user equipment, wherein determining that the call request was generated by a voicebot on behalf of a user equipment comprises determining that the call request is from a text-to-speech neural network platform,
    in response to determining that the call request was generated by a voicebot on a behalf of a user equipment, suspending the call request from being routed to the called target device, and
    while the call request is suspended,
      generating a voicebot confirmation request that identifies the voicebot and the user equipment, and
      providing the voicebot confirmation request to the called target device.

9. The system of claim 8, wherein the call request requests establishment of a proxy voice call between the voicebot and the called target device.

10. The system of claim 9, wherein the proxy voice call does not connect the user equipment to the called target device.

11. The system of claim 9, wherein the user equipment authorized establishment of the proxy voice call but did not generate the call request for the called target device.

12. The system of claim 8, wherein the operations further comprise:
  validating whether the voicebot is permitted to contact and engage in a proxy voice call with the called target device; and
  releasing the call request from suspension to establish the proxy voice call between the voicebot and the called target device.

13. The system of claim 12, wherein validating whether the voicebot is permitted to contact and engage in the proxy voice call with the called target device is based on a community bot registry.

14. The system of claim 12, wherein the operations further comprise determining that the called target device invokes an answering voicebot to engage in the proxy voice call, and wherein releasing the call request from suspension is based on the answering voicebot of the called target device.

15. A computer storage medium having computer-executable instructions stored thereon that, in response to execution by a processor of a system, cause the processor to perform operations comprising:
  intercepting, from a communications network, a call request that is directed to a called target device;
  determining that the call request was generated by a voicebot on behalf of a user equipment, wherein determining that the call request was generated by a voicebot on behalf of a user equipment comprises determining that the call request is from a text-to-speech neural network platform;
  in response to determining that the call request was generated by a voicebot on behalf of a user equipment, suspending the call request from being routed to the called target device; and
  while the call request is suspended,
    generating a voicebot confirmation request that identifies the voicebot and the user equipment, and
    providing the voicebot confirmation request to the called target device.

16. The computer storage medium of claim 15, wherein the call request requests establishment of a proxy voice call between the voicebot and the called target device, and wherein the proxy voice call does not connect the user equipment to the called target device.

17. The computer storage medium of claim 16, wherein the user equipment authorized establishment of the proxy voice call but did not generate the call request for the called target device.

18. The computer storage medium of claim 15, wherein the operations further comprise:
  validating whether the voicebot is permitted to contact and engage in a proxy voice call with the called target device; and
  releasing the call request from suspension to establish the proxy voice call between the voicebot and the called target device.

19. The computer storage medium of claim 18, wherein validating whether the voicebot is permitted to contact and engage in the proxy voice call with the called target device is based on a community bot registry.

20. The computer storage medium of claim 18, wherein the operations further comprise determining that the called target device invokes an answering voicebot to engage in the proxy voice call, and wherein releasing the call request from suspension is based on the answering voicebot of the called target device.

* * * * *